(12) United States Patent
Pennock et al.

(10) Patent No.: US 6,807,562 B1
(45) Date of Patent: Oct. 19, 2004

(54) AUTOMATIC AND SELECTIVE ASSIGNMENT OF CHANNELS TO RECIPIENTS OF VOICE CHAT DATA

(75) Inventors: John P. Pennock, Issaquah, WA (US); Drew C. Bamford, Mountain View, CA (US); Damon V. Danieli, Clyde Hill, WA (US); Matthew J. Stipes, Woodinville, WA (US); John R. Selbie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,966

(22) Filed: Feb. 29, 2000

(51) Int. Cl.[7] ............................................... G06F 15/16
(52) U.S. Cl. ......................................... 709/204; 463/42
(58) Field of Search ................................ 709/204, 206, 709/207, 205, 228, 227; 463/42

(56) References Cited

U.S. PATENT DOCUMENTS 5,758,079 A * 5/1998 Ludwig et al. ............. 709/204
6,226,686 B1 * 5/2001 Rothschild et al. ......... 709/245

OTHER PUBLICATIONS

Harrick M. Vin et al. "Multimedia Conferencing in the Etherphone Environment", COMPUTER, IEEE 1991. pp. 69–79.*
TEAMSPEAK, Date unknown—retrieved Mar. 17, 2004 Internet: www.teamspeak.org.*
PalTalk, Date unknown—retrieved Mar. 17, 2004 Internet: www.paltalk.com.*
Roger Wilco!—Voice Chat for Games, Date unknown—retrieved Mar. 17, 2004 Internet rogerwilco.gamespy.com.*

* cited by examiner

Primary Examiner—Dung C. Dinh
(74) Attorney, Agent, or Firm—Ronald M. Anderson

(57) ABSTRACT

A method and system for selecting contacts to participate in a voice chat session over a communications network, such as the Internet, and for assigning contacts to a plurality of chat channels both automatically and manually. In a multi-player game application, the method enables a player to host a chat session by providing a list of contacts from which the host can choose other player who will be invited to join the chat session and thereafter, to participate in the game. Upon joining the chat session, players are automatically assigned to chat channels, for example, based on an order in which they join the session. Optionally, chat channel assignments may be pre-assigned by the host, or reassigned by individual users after the initial automatic assignment. In addition, players can be selectively assigned to a "team" channel. The system employs an online messaging service to provide the list of contacts for each player, and implements a gaming utility application that enables the users to easily host and join chat sessions, and selectively control channel assignments. The system further includes a channel controller device that is connected to each user's computer and enables each user to selectively control which other players are able to hear them during a voice chat session, which is particularly advantageous during the playing of multiplayer games over the Internet or other network. Each of the channel controller devices is connected to a headset that includes a pair of headphones and a microphone.

36 Claims, 15 Drawing Sheets

AUTOMATIC AND SELECTIVE ASSIGNMENT OF CHANNELS TO RECIPIENTS OF VOICE CHAT DATA

FIELD OF THE INVENTION

This invention generally relates to online voice chat sessions, and more specifically, pertains to selecting recipients of voice chat data and is especially useful for enhancing communication between players in multiplayer online electronic games.

BACKGROUND OF THE INVENTION

The popularity of multiplayer online games on the Internet has exploded in recent years. Unlike conventional single-player computer games, multiplayer online games enable a player to participate in games with other players, either as an individual or as a team member. The multiplayer aspect of these games adds to the players' gaming experience by offering new gaming considerations, including strategy, teamwork, and promoting rivalry with competing players.

Communication between players during the game is often a key aspect of multiplayer game play. For example, members of a team can devise strategy during on-line text chat sessions, as a game progresses. Under certain circumstances, it may be desirable to communicate with other players on a one-to-one basis. At other times, it may be advantageous to communicate with all of the members of an entire team. In the past, players have been able to communicate with one another by entering text in a chat dialog for transmission over the network to one or more other selected players. This text-based chat method favors those players with the best typing skills, and requires players to set aside their game control devices in order to use a keyboard to chat with other players. It is also extremely inconvenient to stop directing the game action to change the person or persons the text messages are being directed to. To minimize the amount of typing required while chatting in this manner, more experienced players have developed abbreviated code to communicate longer messages with fewer characters. However, new players are placed at a disadvantage, since they are not likely to know the abbreviated code, and even if they have a key to the code, their communication will be slowed since they are not familiar with it.

Clearly, it would be desirable to employ advances in gaming hardware and software to enable players to communicate verbally to one another over separate voice chat channels. Providing such an option would greatly enhance communication, since verbal speech is much faster than text-based communication, and does not require the players to remove their hands from their game control devices in order to communicate. In addition, enabling players to verbally communicate with one another will substantially eliminate the advantage that the more experienced players have had over beginning players, with respect to typing speed and use of abbreviated codes.

Ideally, a verbal chat session should provide an easy way for players to initiate a voice chat session and enable them to selectively communicate with other players in a game through use of an intuitive interface. Additionally, the players should be able to selectively assign chat channels to selected individual player(s) or entire teams so that each player can more easily control the other players who will hear them, and those who will not.

SUMMARY OF THE INVENTION

In accordance with the present invention, a method and system are provided for enabling various players to participate in a voice chat session conducted over a communications network, in which players are either automatically or manually assigned to different voice chat channels. The method enables a player to host a chat session by automatically generating a list of contacts from which the host can choose to invite others to join the voice chat session. Upon joining the voice chat session, players are automatically assigned to voice chat channels based on an order in which they join the voice chat session. Optionally, voice chat channel assignments may be pre-assigned by the host, or reassigned by individual users after their initial automatic assignment. In addition, players can be selectively assigned to a "team" channel, and players may use an "all" channel to communicate with all of the participants in a voice chat session. By assigning players to chat channels in this manner, each player is able to choose which other players are able to hear them during the voice chat session, which is particularly advantageous during the playing of online multiplayer games.

According to a first aspect of the invention, a method for enabling voice chat communication over a communications network comprising a plurality of electronic devices (e.g., personal computers (PCs)) linked in communication is provided. Each of the electronic devices is operated by a different user having a unique user identification. A plurality of voice chat channels are controlled through the combined use of a gaming utility application running on each computer and a channel controller device connected to each computer. Optionally, various keys on a keyboard may be remapped to serve the functions of channel controller device described below. In addition, each of the channel controller devices is connected to a headset that is worn by a user that includes a pair of headphones and a microphone. The gaming utility application cooperates with an online messaging service, preferably Microsoft Corporation's MSN Messenger Service™, so as to provide a list of contacts for each of the users based on the contact list of each user with the online messaging service, along with a messaging service availability status for the users. Upon logging onto the communications network and launching the gaming utility and the online messaging service, each user is presented with a user interface that includes a chat pane on which a list of chat sessions the user may join is displayed, along with a list of contacts for the user.

A user can host a chat session by selecting contacts in the contact list who will be invited to join the voice chat session, whereupon each of the selected contacts is provided with an electronic invitation to join the chat session, preferably comprising both text and a verbal content. Upon acceptance of the invitation, each user is automatically assigned to a voice chat channel on the host's computer based on an order in which the user joins the chat session. Preferably, the voice chat channel assignments are based on the next available channel for both the host and the other chat session participants. As each channel is assigned, visual indicia on each chat session participant's channel controller device are enunciated, and a computer-generated voice announcement regarding the voice chat channel assignments is provided to each chat session participant over the participant's respective headset.

Each user may manually reassign users on their voice chat channels, and the host may pre-assign voice chat channels to contacts the host desires to invite to the chat session. The host is also enabled to select whether the voice chat session may only be joined by invited contacts, or may be joined by anyone. An IP address corresponding to the network address of the host's computer is provided to the host so that the host may communicate the IP address to other users who are not in the host's contact list to enable these other users to join the chat session. Preferably, if such session is by invitation only, this IP address is not made available to the other users so that the host can control which persons participate in the voice chat session.

In accordance with further aspects of the present invention, the channel controller device enables each user to selectively determine the other users who are enabled to hear the user. The channel controller device includes various control buttons corresponding to a plurality of individual voice chat channels, a team chat channel, and an "All" channel. The device enables a user to selectively assign individual voice chat channels to the team chat channel without requiring that such assignment be made with the user interface of the gaming utility application, which provides an optional alternative method for assigning channels to the team chat channel. If desired, a user can selectively have all of the other participants in the voice chat session hear the user by activating the "All" channel button. The channel controller device further includes control buttons for toggling between a voice chat data mode and a voice recognition command and control mode, as well as for muting the microphone connected to the device. Additionally, the channel controller device includes electronic circuitry for converting analog microphone data into a digitally encoded format suitable for transmission over a Universal Serial Bus (USB) interface, and for decoding digitally-formatted chat data received from other users' electronic devices and converting the data into appropriate signals for driving the headphones to the user to hear other chat session participants who have assigned the user to one of their voice chat channels.

A still further aspect of the present invention is directed to a system that implements the steps of the method discussed above. The system includes a processor and memory for storing machine instructions executed by the processor to implement functions generally consistent with the steps of the method.

Yet another aspect of the present invention is directed to the channel control device as discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
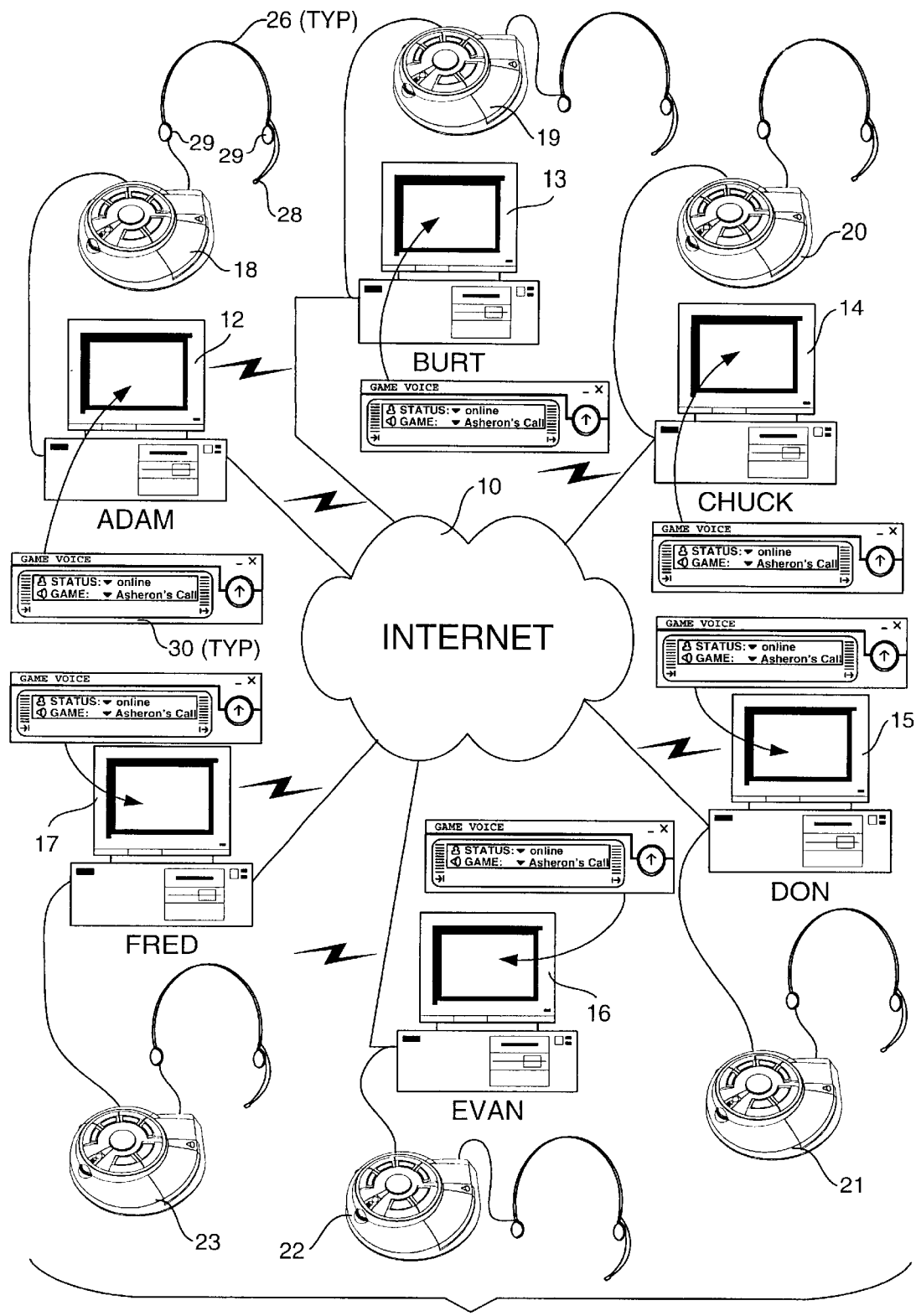
FIG. 1 is a schematic diagram illustrating an exemplary network environment for implementing the present invention over the Internet.
Figure 2:
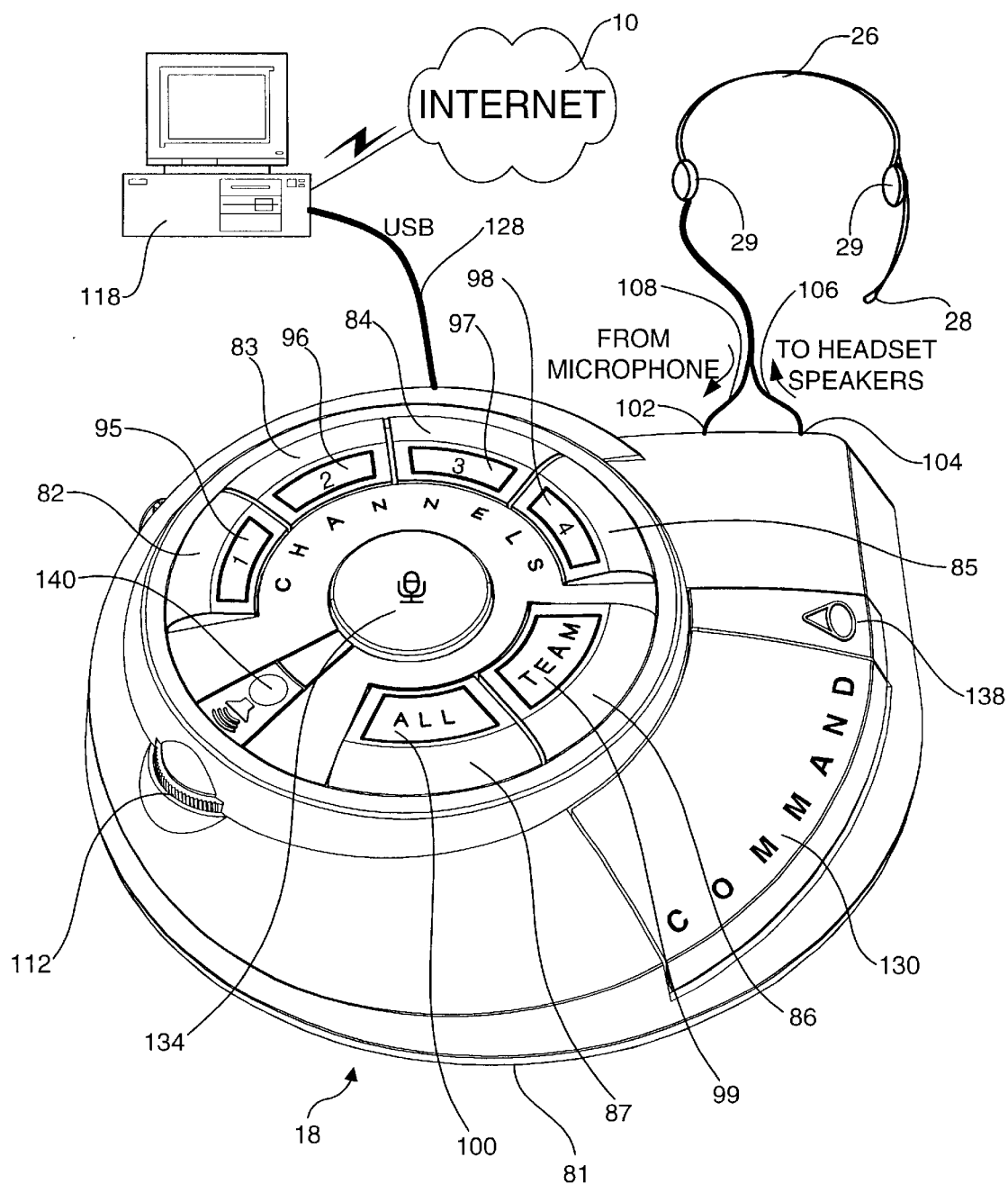
FIG. 2 is an isometric view of a personal computer (PC), a headset, and a channel controller device that is used by a player to select other players who will hear the player speak.
Figure 3:
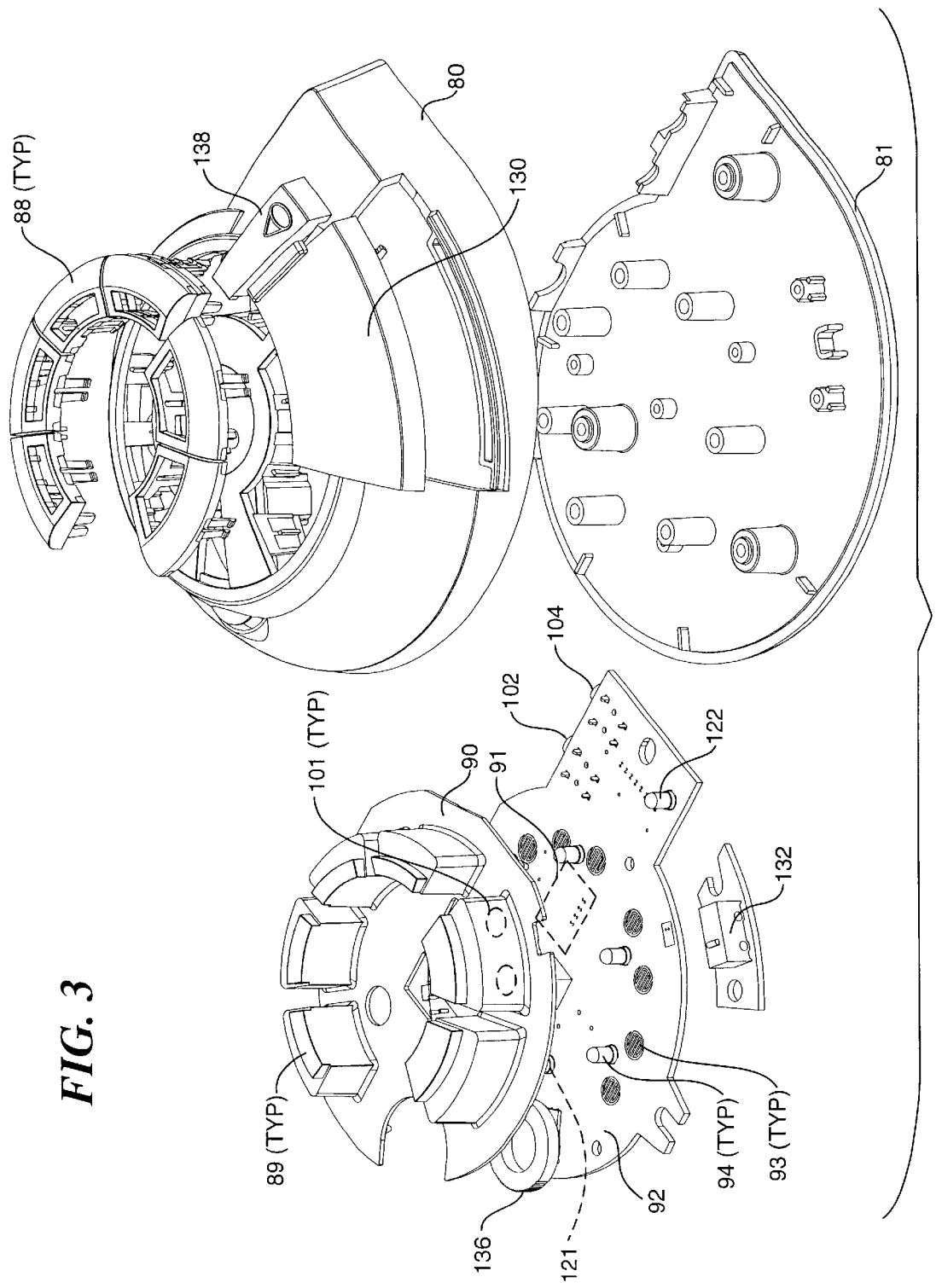
FIG. 3 is an exploded isometric view of the channel controller device of FIG. 2.
Figure 4:
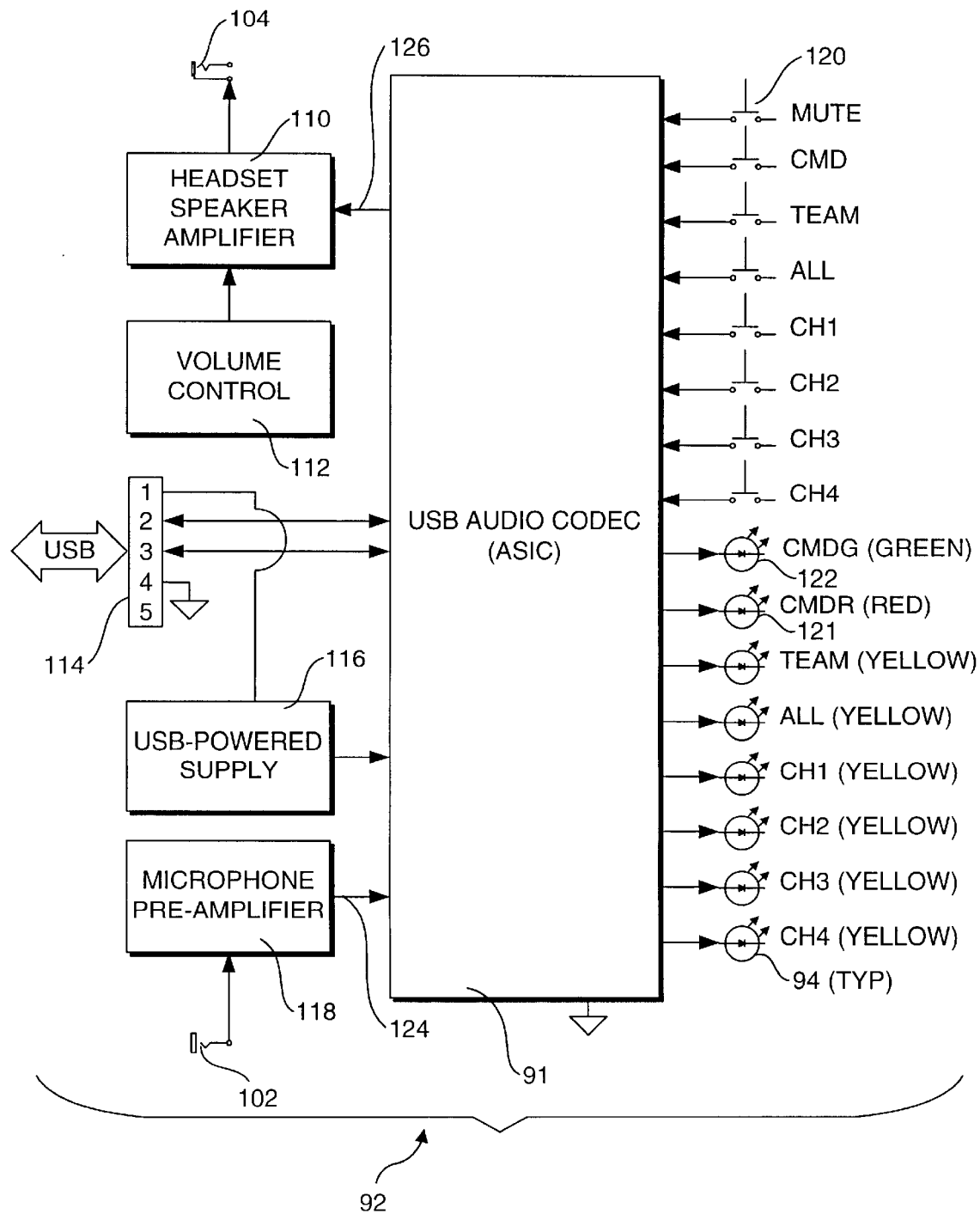
FIG. 4 is an electrical schematic diagram of the circuitry in the channel controller device employed for implementing the various functions that it provides.

An exemplary configuration of an online gaming environment that is suitable for application of the present invention is shown in FIG. 1. Online gaming environments enable a plurality of players to participate in an online game over a communications network such as Internet 10. Each participant operates a respective one of PCs 12, 13, 14, 15, 16, and 17 that executes software code for performing game functions and which is connected to Internet 10. In the exemplary configuration, these participants include players identified by the fictitious names Adam, Burt, Chuck, Don, Evan, and Fred, each of whom is operating a different one of the PCs. For convenience, each of PCs 12–17 is labeled with a respective participant's name. Each of PCs 12, 13, 14, 15, 16 and 17 are connected to a different corresponding channel control device 18, 19, 20, 21, 22 and 23, further details of which are shown in FIGS. 2–4 and discussed below. Each of the channel control devices is further connected to a corresponding different headset 26, which includes a microphone 28 and headphones 29, worn by each of the players, to enable them to communicate with one another during a chat session.

Each of PCs 12, 13, 14, 15, 16, and 17 is also linked in communication with Internet 10, and executes machine instructions that implement the functions of one or more multiplayer online computer games. In addition, each of the PCs is executing (or is able to execute) a gaming/chat utility application 30 (hereinafter referred to simply as a "gaming utility 30") that is used to control gaming and voice chat functions in accord with the present invention.

Preferably, each of the players will initiate a gaming or chat session in the following manner. The player will connect to Internet 10 (if not already connected thereto), and will log onto the MICROSOFT NETWORK (MSN) Messenger Service™ (hereinafter referred to as "MSN messenger"), an online instant message service provided by the Microsoft Corporation. Preferably, each of the players will have built a contact list through functions providing by MSN messenger comprising a list of persons with whom the player prefers to chat and who also use MSN messenger. As typically implemented, this contact list enables a user of MSN messenger to perform text chat sessions with one or more persons listed in the user's contact list.

Figure 5:
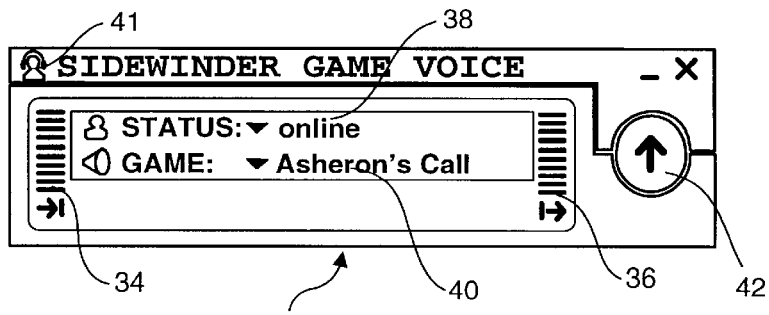
FIG. 5 is a representation of a collapsed user interface frame a player sees following an initial installation and launching of a gaming utility in accord with the present invention.

After logging onto MSN messenger, the player will launch an instance of gaming utility 30. Optionally, as an alternative to first connecting to MSN messenger, upon launching gaming utility 30, the user may be automatically connected to Internet 10 (or prompted to do so), if not already connected, and/or to MSN messenger by internal functions provided by gaming utility 30. As shown in FIG. 5, the initial user interface (UI) of gaming utility 30 comprises an expandable UI Frame 32, which is shown in a collapsed form in this Figure. In its collapsed form, UI Frame 32 includes a left VU meter 34, which graphically displays a relative volume level of an audio signal used to drive headphones 29 of the headset 26 worn by the player, and a right VU meter 36, which graphically displays a relative volume level of audio signals picked up by microphone 28 on the player's headset 26, during a voice chat session. Additionally, UI Frame 32 includes an availability status pull-down control 38 that enables each player to provide an MSN messenger availability status to other players who are logged onto MSN messenger, and a game command set pull-down control 40 that enables each player to select a desired game command set from a list of game command sets defined in a gaming profile for the player. UI Frame 32 additionally includes a system menu that is activated by clicking on a system menu icon 41.

Initially, the MSN messenger availability status of a given player will be "online" if the player has logged on MSN messenger prior to launching gaming utility 30, or offline if the player has not yet logged on MSN messenger. Additionally, the default game command set listed on game command set pull-down control 40 will correspond to the game command set the player last used (or is currently using), while a pull-down list (not shown) that is displayed in response to activation of game command set pull-down control 40 will include the list of game command sets defined by the user's gaming profile.

Figure 6:
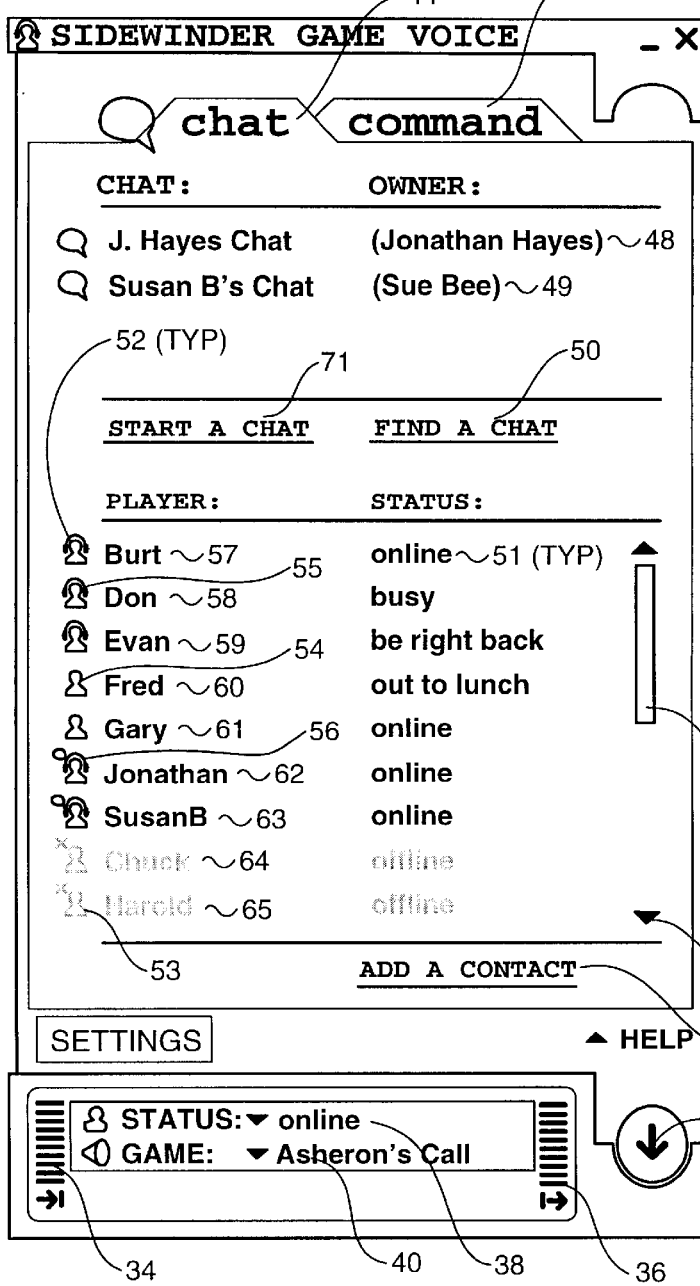
FIG. 6 is a representation of the user interface frame of FIG. 5 when expanded.

Typically, a player will want to initiate or join a game or a voice chat session. Accordingly, the player will activate an expansion control 42, which will cause UI Frame 32 to expand to its expanded configuration, as shown in FIG. 6. In the expanded configuration, UI Frame 32 includes a primary pane comprising a chat pane 44 or a command and control pane 46; either of these two panes can be activated and displayed (one at a time) by clicking on the pane's corresponding tab (i.e., by clicking on the "chat" or "command" tab) at the top of each pane. Chat pane 44 is the default pane that is displayed when gaming utility 30 is initially installed and launched, and provides information to each player concerning existing chat sessions the player may join and the availability status of persons in the player's MSN messenger contact list. After the initial launch, the primary pane that will be displayed is the last pane that was displayed before the gaming utility was closed.

At a top portion of chat pane 44, a list of presently active chat sessions that are being conducted over the network or networks into which the player is connected will be displayed, such as a chat session 48 hosted by a Jonathan Hayes and a chat session 49 hosted by a Sue Bee, as shown in FIG. 6. In general, the list of presently active chat sessions will include chat sessions that: (a) are hosted by a person in the player's chat contact list; (b) active over the same network or networks to which the player is connected; and (c) either an open chat session (i.e., a chat session that anyone may join) or chat sessions the player has been invited to join. For instance, if the player is logged onto a local area network (LAN), the displayed chat sessions will include all of the chat sessions hosted by persons in the player's contact list who are presently hosting a chat session on the LAN that include either an open invitation to all other players, or an invite-only list that includes the player. Similarly, if the player is logged onto Internet 10, the displayed chat sessions will include all of the chat sessions hosted by persons in the player's contact list who are presently hosting a chat session on Internet 10 that includes either an open invitation to all other players or an invite-only list that includes the player. Furthermore, the foregoing holds true for players that are simultaneously connected to a LAN and the Internet or other networks—i.e., the list of chat sessions will include appropriate contacts who are hosting chat sessions on both the Internet and the LAN and/or other networks.

A player can join one of the listed chat sessions by simply clicking on it. For example, clicking anywhere on the line corresponding to chat session 48 will enable the player to join the chat session hosted by Jonathan Hayes. Accordingly, only open chat sessions and chat sessions to which the player has been invited are displayed. Upon joining a chat session, the player will be automatically assigned to a chat channel as described below.

In addition to being able to join listed chat sessions, the player may join a chat session known to the player, but hosted by a person who is not logged onto MSN messenger, by activating a "Find a chat" hyperlink 50, which will launch a dialog in which the player may enter an IP (Internet Protocol) address of the known chat session. The player will be joined to any chat session that is being hosted on a computer at the entered IP address.

A list of MSN messenger contacts for the player will be displayed in a lower portion of chat pane 44. A respective MSN messenger status 51 will be listed to the right of each contract, while a respective gaming utility status icon 52 will be displayed to the left of each contract. MSN messenger maintains a contact status for each member of its messaging service, which is accessed behind the scenes by gaming utility 30 to generate the MSN messenger statuses in the list, as follows. The gaming utility implements a light weight (almost stateless) protocol on top of MSN messenger's text transport protocol. A set of messages exists such that the gaming utility can discover which of the player's contacts are logged onto the communications network, logged into MSN messenger, and running the gaming utility on their own computers. Each contact is perceived to be in one of the following states.

Offline: Contact is not online with MSN messenger; indicated by a lightened name, a lightened "offline"

MSN messenger status, and a gaming status comprising lightened base icon with an adjacent "X," as shown by an icon 53.

Messenger Online: Contact is online with MSN messenger, but is not running the gaming utility; contact's MSN messenger status is listed as online (or with contact's manually selected status—see below), and the gaming utility status is displayed as a darkened base icon, as shown by an icon 54.

Game/Chat Online: Contact is online with MSN messenger and is running the gaming utility; contact's MSN messenger status is listed as online (or as contact's manually selected status), and the gaming utility status is displayed as a darkened base icon with headset, as shown by an icon 55.

In-Chat: Contact has joined a voice chat session with the gaming utility; contact's MSN messenger status is listed as online (or as contact's manually selected status), and the gaming utility status is displayed as a darkened base icon with headset and chat balloon, as shown by an icon 56.

Hosting: Contact is hosting a voice chat session with the gaming utility; contact's MSN messenger status is listed as online (or as contact's manually selected status), and the gaming utility status is displayed as a darkened base icon with headset and chat balloon (i.e., as icon 56).

Hosting/Locked: Contact is hosting a private session with the gaming utility; status indications are the same as for Hosting.

As indicated above, the MSN messenger status for a given contact will be either the automatically determined status of the player, either online or offline, or a status that is manually set by the contact, which overrides the automatically determined status. Manually selected statuses include "online," "busy," "be right back," "away," "on the phone," "out to lunch," and "appear offline." As the last entry listed implies, if a contact has selected the status of "appear offline," that person will appear to be offline to other players, even though the player is logged onto MSN messenger.

As discussed above, when the gaming utility is launched, it will log the player onto MSN messenger if the player has not already done so. Next, the gaming utility will acquire the player's contact list from MSN messenger. The messenger component of the gaming utility will then initiate status queries to each online contact. The contact list in UI Frame 32 will then become populated as the status of each player is determined.

As shown in FIG. 5, an exemplary set of contacts corresponding to player Adam's contact list is displayed on chat pane 44. These contacts include players Burt 57, Don 58, Evan 59, Fred 60, Gary 61, Jonathan 62, Susan B. 63, Chuck 64, and Harold 65. The names in a contact list will be the MSN messenger user names (i.e., aliases) for those contacts. Typically, these names will comprise "handles," shortened name forms, or nicknames rather than full actual names, although the latter may be used if so chosen by the contact. If the contact list exceeds the available display area, additional contacts (and their corresponding statuses) may be viewed by dragging the slider on a scroll bar 66 or activating a scroll-down control 67.

Figure 7:
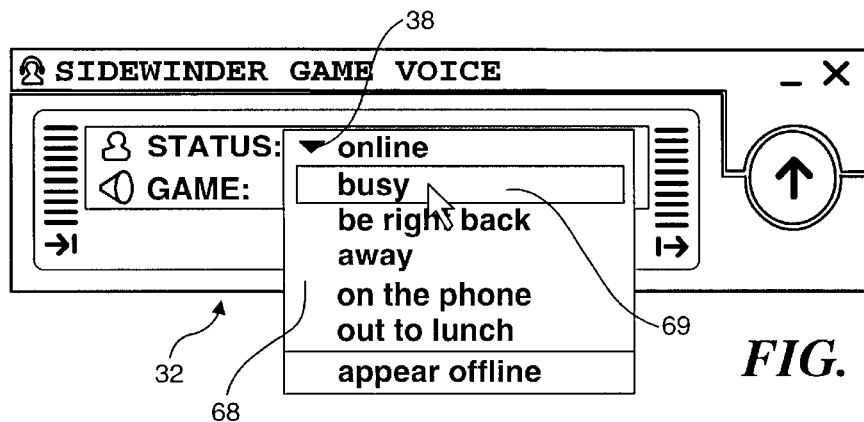
FIG. 7 is a representation of an activation of a pull down control in the user interface frame that is used to enable a player to change the player's availability status.

As discussed above, the availability status for each contact is determined as a function of the state perceived by MSN messenger, including those statuses that are manually set by the contact. In addition to being able to manually select an availability status with MSN messenger, a player can manually change the availability status by activating availability status control 38, as shown in FIG. 7, enabling the player to select an availability status from a pull-down list 68, which includes a "busy" status 69.

Preferably, the contact list will be sorted in the following manner. First, contacts who are logged on and are running an instance of gaming utility 30 will be listed first in alphabetical order, based on their MSN messenger user name. Next, contacts who are logged on but have yet to activate (or do not have) the gaming utility will be listed alphabetically by user name. Finally, contacts who are presently not logged on are listed at the bottom of the list, alphabetically by user name.

A player may desire to add a new contact to the list of contacts. To do so, the player activates an "add a contact" hyperlink 70, which automatically opens MSN messenger's "add contact" wizard. After adding a new contact, the contact list will be updated to include the new contact and the new contact's present availability status.

Figure 8:
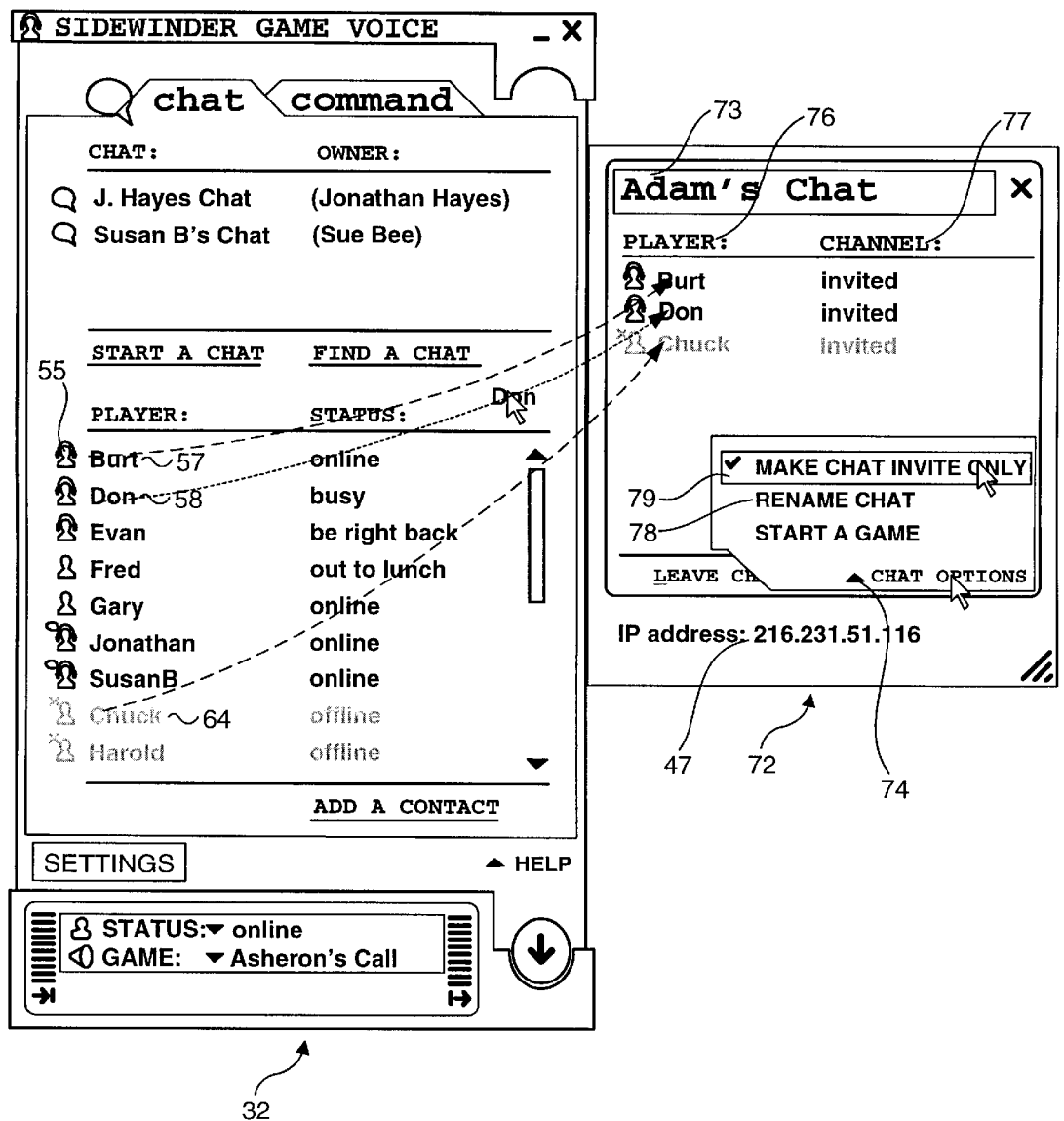
FIG. 8 is a representation of the user interface frame and a chat room pane that is displayed upon opening a new voice chat session, illustrating a method used to invite a player's contacts to join the voice chat session.

Initiation of a chat session can be accomplished in one of two ways. According to a first method, a new chat session is initiated when a user activates a "start a chat" hyperlink 71, which causes a chat room pane 72 to be displayed adjacent to UI FRAME 32, as shown in FIG. 8. A default chat name appears in a title box 73, comprising either the last chat name used by the player or "<contact name>—Chat." This default chat name may be edited by the player by activating a "Chat Options" control 74 and selecting a "Rename Chat" menu option 78.

Whenever a chat room pane is opened, a list of players presently participating in the chat session (the player viewing the chat room pane is never shown, since that player is an implied participant) will be displayed in a "Player:" column 76, along with a channel assignment or invite status under a "Channel:" column 77. If the player viewing the chat room pane is the host of a chat session, the player will be able to see a list of all of the present participants and players that have been invited to join that chat session. If the player is not hosting the chat session, that player will only see the names of the present participants. Initially, the list of chat participants for a new chat session will be blank, since no contacts have been invited to join the new chat session at this point.

Figure 9:
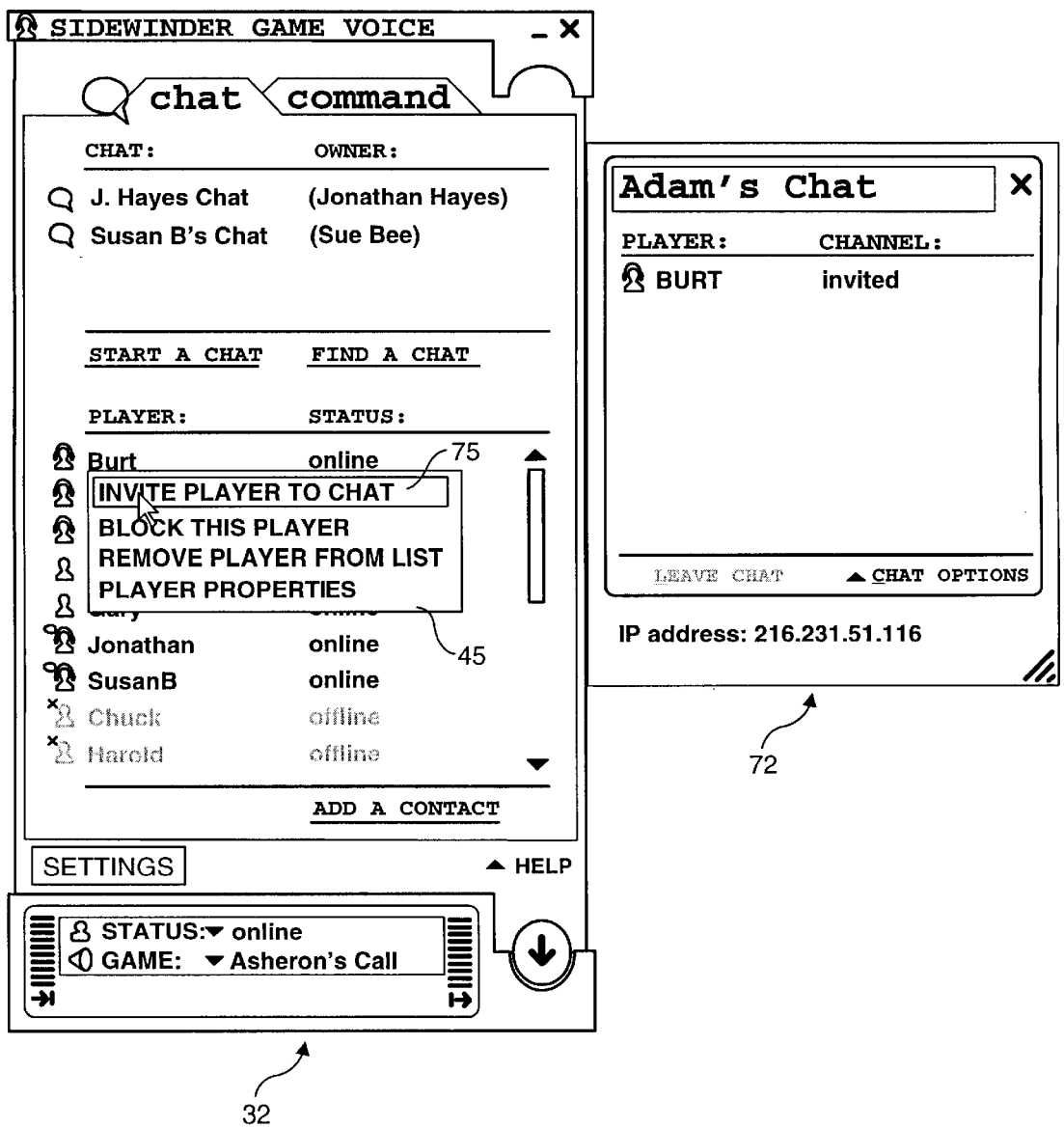
FIG. 9 is a representation showing an activation of a context menu in the user interface frame, for inviting a contact to join a voice chat session.

In order to host a chat session that enables the session participants to communicate with one another via the voice chat capabilities provided by gaming utility 30, it is necessary to select one or more players in the contact list who the host would like to have participate in the chat session. For example, suppose a player (e.g., Adam) would like to host a chat session that is to initially include Burt 57, Don 58, and Chuck 64. This process can be accomplished in one of three ways. Adam can: (a) double click on each contact he would like to invite to the chat session; (b) drag the desired contacts onto chat pane 72, such as shown in the Figure; or (c) select one or more contacts, activate chat pane 44's context menu, and selecting an appropriate option to invite the contact or contacts. When using a mouse, activation of chat pane 44's context menu can be performed by the mouse cursor over a contact name and activating the left or right mouse button or pressing the space bar on the PC's keyboard, bringing up a context menu 45, as shown in FIG. 9, from which the player can select to invite the player to join the chat session by choosing a "Invite player to chat" option 75. Note that this approach represents an alternative way to initiate a chat session—i.e., if a chat session has not been started, selecting a player to invite to a chat session in this manner will automatically open a new chat session.

When a player is initially invited to the chat session, the player's contact name will be displayed in chat pane 72, along with the gaming utility status icon of the player and an "invited" channel assignment status. If the invited contact has yet to log on, the contact's name and the word "invited" are lightened.

If an invited contact has a current MSN messenger status of "online" and is running an instance of gaming utility 30, the contact will receive an invitation message causing a modal dialog to appear on the contact's screen inviting the contact to join the initiator's chat session. In addition, the contact will receive a verbal invitation over the speakers of his headset. For example, of the three players (Burt, Don, and Chuck) invited by Adam in the foregoing example, Burt is the only contact that has an MSN messenger availability status of "online," and a gaming utility availability status icon 55 indicating that Burt is running an instance of gaming utility 30. This status icon means that Burt is presently logged on to Internet 10 and MSN messenger, is running the gaming utility, and has not selected an availability status that indicates he is unavailable. Accordingly, a modal dialogue (not shown) will pop up on Burt's PC 13 displaying an invitation message reading "Adam invites you to CHATTER)™," with accept and decline button options. In addition, Burt will receive an audio message conveying the same invitation message over headphones 29 of Burt's headset 26, followed by, "Accept?"This function is made possible through a text-to-speech (TTS) capability of the command and control features provided by the gaming utility and hardware functions implemented in Burt's channel controller device 19. In response to receiving the invitation, Burt may select to join or decline the chat session by clicking on a corresponding button in the dialog box. Optionally, the invitation can be accepted by toggling the channel controller device to a command and control mode and speaking "Yes" or "No" into the recipient's microphone. Further details of how these functions are handled are disclosed in co-pending application Ser. No. 09/515,559, entitled "ENABLING SEPARATE CHAT AND SELECTIVE ENABLEMENT OF MICROPHONE," filed on Feb. 29, 2000, the disclosure and Drawings of which are hereby specifically incorporated herein by reference.

All chat sessions are initially "open" chat sessions by default. An open chat session enables anyone to join the session, including both invited contacts and other players who are made aware of the existence of the session. For example, open chat sessions hosted by contacts in a player's contact list will be displayed in an upper portion of chat pane 44, as discussed above. In many instances, a chat session host may wish to limit the chat session to only include the contacts the host has invited to join the session. The host can select this option by activating "Chat Options" control 74, and selecting a "Make Chat Invite Only" menu option 79 to toggle a checkmark disposed adjacent to the option on, converting the chat session to an invite-only session. In accordance with the host selecting the invite-only option, each player will hear, "<Host Name> made chat room invite only" in their invitation announcements.

In some instances, it may be desired to invite people to join a chat session who do not use MSN messenger. This action can be accomplished by informing them of the IP (Internet Protocol) address from which the chat session is hosted (typically by an e-mail or telephone invitation). Such an address is displayed as an IP address 47. As discussed below, this address will only appear in the chat room pane of the host, and will not appear in the chat room panes of the other chat participants.

An important aspect of the present invention concerns the automatic and selective assignment of chat channels for invited players, and players who join an open chat session. In order to better understand the purpose for assigning channels, and how such channel assignments can be used to a player's advantage, a discussion of the channel controller device's construction and use is now presented.

With reference to FIGS. 2–4, channel controller device 18 (identical to channel controller devices 19–23) enables a player to communicate with one or more other players by selectively activating a plurality of chat channels that have been assigned to those players. Each chat channel is an independent or private voice data channel that enables voice communication between the player and the other player or players that are selectively assigned to that chat channel. For example, players often form teams to participate in online multi-player games, wherein all the players on a team may wish to discuss strategies by talking on a "team channel." Alternatively, individual players on a team may wish to communicate with one another on individual channels so that their communications are not overheard by other players not assigned to those channels. Accordingly, channel controller device 18 includes a plurality of buttons disposed within a housing 80 that is coupled to a base 81. The buttons, which are pressed to selectively activate respective chat channels, include a first channel button 82, a second channel button 83, a third channel button 84, a fourth channel button 85, a "team" button 86, and an "all" button 87.

As shown in FIG. 3, each channel button comprises a key 88 that is disposed over a corresponding membrane switch dome 89 formed in a membrane switch sheet 90 that is fabricated from a silicone polymer. Each of membrane switch domes 89 includes a pair of conductor disks 101 (only shown for one switch dome) that are disposed adjacent to the base of the dome. Membrane switch sheet 90 is disposed above a circuit board 92 that includes a plurality of membrane switch conductor pads 93, which are disposed opposite corresponding conductor disks 101 when assembled. Each membrane switch conductor pad 93 comprises a pair of conductor traces that form an incomplete electrical circuit, i.e., an open switch. As a player presses down a key 88 to select or deselect a particular chat channel, a corresponding membrane switch dome 89 is caused to flex, causing one or both of conductor disks 101 for the membrane switch dome to contact adjacent switch conductor pads 93, thereby completing one or both of the electrical circuit (i.e., closing the switch) corresponding to the switch conductor pad(s) 93 that is (are) contacted by the conductor disks. This switch closure is sensed by an application specific integrated circuit (ASIC) 91 disposed on the underside of circuit board 92. The ASIC toggles the channel between an active and inactive state in response to sensing the switch closure.

When a channel is on (i.e., activated), a corresponding light emitting diode (LED) 94 mounted to circuit board 92 and disposed within a membrane switch dome 89 corresponding to the channel is energized to indicate the channel has been selected by the player. In this manner, a plurality of channel activation indicators are provided, including a first channel indicator 95, a second channel indicator 96, a third channel indicator 97, a fourth channel indicator 98, a team channel indicator 99, and an "all" channel indicator 100, each of which is enunciated by a different one of the LEDs 94.

A lead 106 from headphones 29 on headset 26 is electrically connected to an audio output jack 104, while a lead 108 from microphone 28 on the headset is connected to an audio input jack 102 on each channel controller device, at the back of housing 80. Audio input jack 102 and audio output jack 104 are mounted on circuit board 92. It should be noted that a single multi-terminal jack can alternatively be employed for input and output audio data on the channel controller device, if desired. The headphones thus receive audio chat data (voice messages) from other players, while the verbal chat messages spoken by the player wearing the headset are picked up by the microphone on the headset and conveyed to the other one or more players selected by the player, as determined by the one or more keys 88 on the channel controller device the player has activated.

As shown in FIG. 4, the primary functional components of circuit board 92 include ASIC 91, a headset speaker amplification circuit 110, a volume control 112, a USB connector 114, a USB-powered supply circuit 116, a microphone pre-amplification circuit 118, a plurality of input switches 120, a plurality of yellow channel indicator LEDs 94 corresponding to individual channels 1–4 and the "team" and "all" channels, and a red mute LED 121, and a green command and control LED 122.

ASIC 91 includes audio processing circuitry that comprises appropriate signal conversion and CODEC (encoding/decoding) components for processing a pre-amplified microphone input signal 124 and a pre-amplified headset speaker output signals 126. Microphone 28 produces an analog signal having a frequency and an amplitude corresponding to the sound incident on the microphone and thus indicative of a verbal chat message spoken by a player into the microphone. Accordingly, circuitry is provided for converting the analog signal into a digital format (e.g., an analog-to-digital converter), and encoding the signal so it can be more efficiently transmitted over a communications link. A preferred communications link comprises a Universal Serial Bus (USB) interface 128 that connects channel controller device 18 to a player's PC, e.g., Adam's PC 12. The PC converts the USB formatted signal into packets appropriate for transmission over the network. Circuitry for performing the reverse function is also provided to enable another player's voice to be replicated by headphones 29. In this instance, packets conveying an encoded audio signal are transmitted from one of the other player's PCs to PC 12 over Internet 10. The encoded audio signal is then transmitted via USB interface 128 to the channel controller device and the decoder/converter portion of ASIC 91 first decodes the encoded signal and then converts the decoded signal from a digital format into an audio signal that is output as pre-amplified headphone signal 126, which is then amplified by headphone amplifier 110 to drive headphones 29.

Channel controller device 18 further includes a command and control button 130 that actuates a toggle switch 132 mounted to base 81, a mute button 134 operatively coupled to a mute toggle switch (not shown), and a volume control knob 136, that is coupled to volume control 112. Actuation of command and control button 130 toggles the player between a voice chat mode and a command and control mode, thereby enabling the player to direct the verbal data for chat purposes or for game control purposes. When used for game control purposes, a speech recognition module included in gaming utility 30 is employed to convert spoken commands into defined control actions that implement secondary control functions in the game. When in a command and control mode, a translucent voice chat indicator panel 138 is lighted by green command and control LED 122, which is disposed beneath the indicator panel. When in a voice chat mode (for voice communication over one of the chat channels), voice chat indicator panel 138 is not lighted.

Activation of mute button 134 mutes microphone 28 so as to enable a player to talk to other persons in the same room as the player or connected through a different communication link such as a telephone, without transmitting any of the voice data acquired by microphone 28 to the other players, or to avoid having the voice data interpreted as voice commands (when the channel controller device is in the command and control mode). While microphone 28 is muted, a mute indicator 140 is lighted by red LED 121, which is mounted on circuit board 92 and disposed beneath mute indicator 140. Additionally, rotation of volume control knob 136, which is coupled to volume control 112, enables the player to control the level of the sound produced at headphones 29.

The various voice chat channels may be assigned in one of several ways, including: (a) pre-assignment through the gaming utility UI; (b) automatic assignment; and (c) manual reassignment through the gaming utility UI. Generally, players will choose to have their voice chat channels automatically assigned, as follows.

In general, as each contact joins a chat session, the new contact is assigned to the next available channel, beginning with channel 1 for the first contact to join the host in a chat session. As discussed below, new contacts will be added to the "all" channel when individual channels 1–4 have already been assigned, and that each contact that is assigned to one of channels 1–4 is assigned to the "all" channel at the same time. Also, each player will be verbally notified by a computerized voice over the player's headset speakers 29 of the channel assignments for that user as each player is added to the chat session, and corresponding channel indicators will be enunciated on each player's channel controller device.

Figure 10:
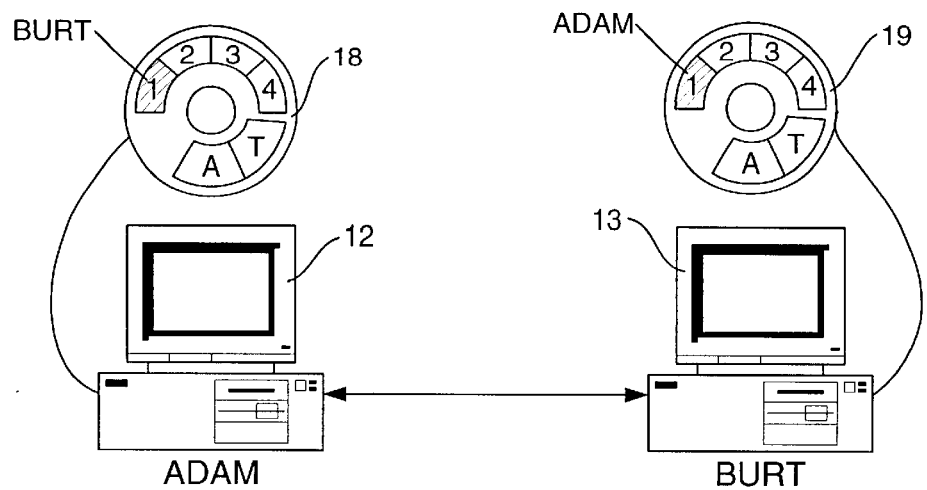
FIG. 10 is a schematic diagram illustrating an automatic assignment of a chat channel when a first player joins a voice chat session hosted by another player.

If upon receiving the invitation to join Adam's chat session, Burt decides to accept the invitation, Burt is automatically assigned to the first channel of Adam's channel controller device 18, while Adam is automatically assigned to the first channel of Burt's channel controller device 19, as shown in FIG. 10. Additionally, Adam will hear the message, "Burt connected on one", while Burt will hear the message, "Adam connected on one" on the headphones of their respective headsets 26. In addition to assigning the first channel on both of Adam and Burt's channel controller devices 18 and 19 in this manner, the first channel indicators 95 on each of the channel controller devices will become lighted. (Note that in this and the following Figures, cross-hatching of a channel indicator is used to indicate that the channel indicator is lighted.) A lighted channel indicator means the corresponding channel is active for sending voice data to the contact or contacts assigned to that channel.

Figure 11:
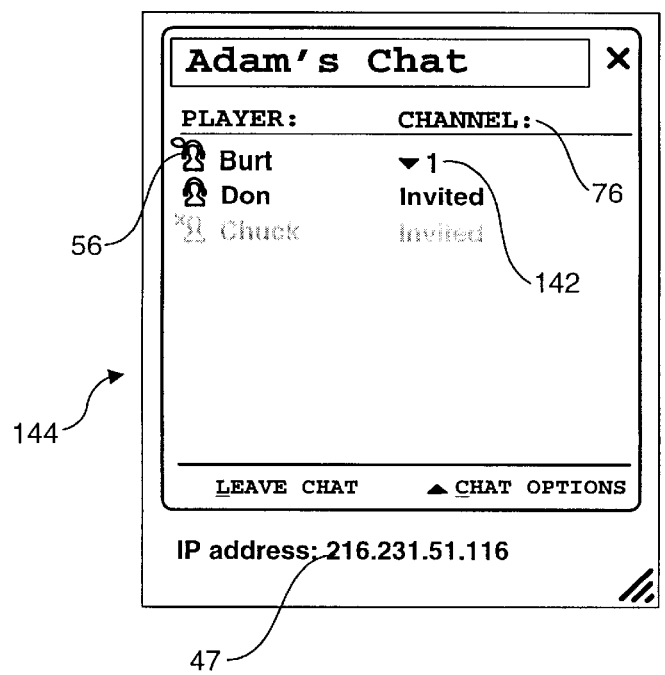
FIG. 11 is a representation of an exemplary chat room pane displayed to a player hosting a chat session.
Figure 12:
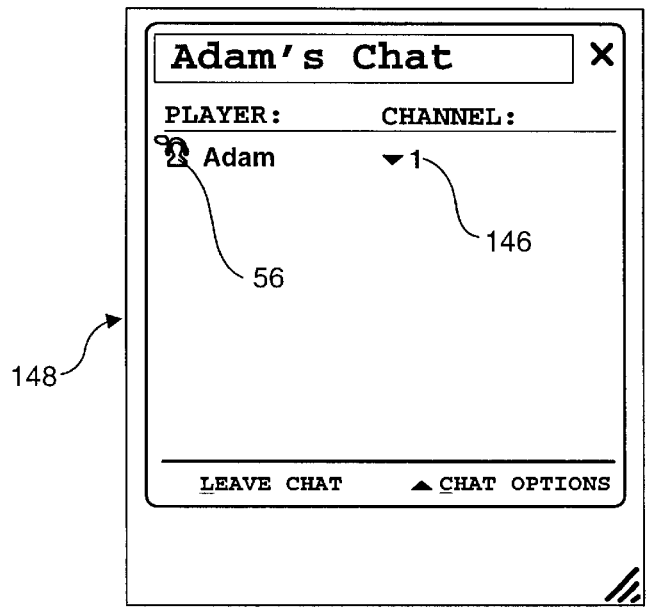
FIG. 12 is a representation of an exemplary chat room pane displayed to a player who is not hosting a chat session.

The chat room pane for each player will also be changed in response to the addition of each new player to a chat session. With reference to FIG. 11, upon joining Adam's chat session, a pull-down channel assignment control 142 with a current value indicating an assignment of channel 1 will be disposed adjacent to Burt's name in a chat room pane 144 on Adam's PC 12 so as to indicate to Adam that Burt is assigned to channel 1 on Adam's channel controller device 18. Similarly, a pull-down channel assignment control 146 with a current value indicating an assignment of channel 1 will be disposed adjacent to Adams's name in a chat room pane 148 on Burt's PC 13 so as to indicate to Adam that Burt is assigned to channel 1 on Adam's channel controller device 19, as shown in FIG. 12. Also, a gaming utility status icon 56 will be displayed adjacent each of Burt's and Adam's names in respective chat room panes 144 and 148, indicating that Adam and Burt are presently participating in the chat session.

Note the differences between chat room panes 144 and 148. In a chat room pane that is displayed on a chat session host's computer, both the contacts who are presently in the chat session and invited contacts are shown, with corresponding chat channel assignments or "invited" statuses also being displayed. For example, since Adam is the chat session host, both Burt, who has joined Adam's chat session, and Don and Chuck, who have been invited to the chat session, but are yet to join, are displayed in Adam's chat room pane 144. In contrast, a chat participant who is not the host of the chat session will only see players other than themselves who are participating in the chat session. Thus, only Adam is shown in Burt's chat room pane 148. Additionally, note that IP address 47 is present on Adam's chat room pane 144 (i.e., the chat session host's chat room pane), but is not present on Burt's chat room pane 148 (i.e., not on the chat room pane of a chat session participant who is not hosting the session). The reason that the IP address is not shown in the chat room pane of those participants who are not acting as the host is to enable the host to control who may join a chat session (in the case of invite-only chat sessions).

With reference to FIG. 8, recall that when Don and Chuck were initially invited to join the chat session, neither had an MSN messenger availability status indicating that they were immediately available to participate in the session. More specifically, Chuck's MSN messenger availability status was "offline," indicating that he was presently not logged into MSN messenger, while Don's MSN messenger availability status was "busy," an availability status that was manually selected by Don at some earlier point in time.

Figure 13:
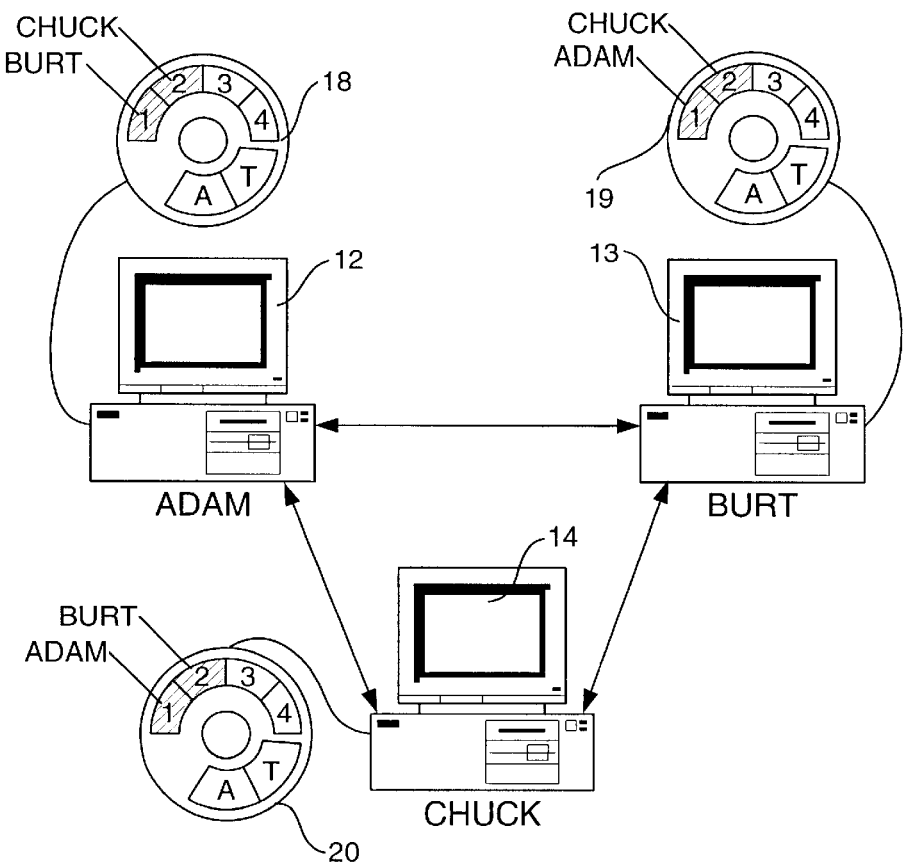
FIG. 13 is a schematic diagram illustrating the automatic assignment of chat channels when a third player joins the voice chat session.

Gaming utility 30 enables invitations to be stored and automatically forwarded so that an invited player can be immediately notified of such an invitation upon logging onto MSN messenger. For instance, if shortly after Adam sends out the original invitation to have Burt, Don, and Chuck to join the chat session, Chuck logs onto Internet 10 and MSN messenger, and opens an instance of gaming utility 30. Upon these events occurring, Chuck will receive an invitation to join Adam's chat session, comprising the modeless dialog and audio invitation that were received earlier by Burt, as discussed above. It is noted that if Chuck is already logged into MSN messenger and has yet to launch gaming utility 30, Chuck will be notified of the invitation upon launching gaming utility 30. Optionally, if Chuck launches gaming utility 30 before logging into MSN messenger, he will be prompted to do so and will receive the invitation message when he logs into MSN messenger. Now suppose that Chuck accepts the invitation. At this point, Chuck will be assigned to the second channel on each of Adam and Burt's channel controller devices 18, 19, as shown in FIG. 13. At the same time, Adam and Burt are respectively assigned to the first and second channels of Chuck's channel controller device 20. Furthermore, each of channels 2 is automatically enunciated on Adam's, Burt's, and Chuck's respective channel controller devices. Note that at this point, first channel indicators 94 may (as shown in the Figure) or may not be lighted, depending on whether either of Adam or Burt has toggled their respective first channel buttons 82 to an active or inactive condition.

In addition to providing visual indicia concerning the new channel assignments, each of Adam, Burt and Chuck will receive a verbal announcement corresponding to their respective channel assignments over their headsets, as follows. Both Adam and Burt will hear, "Chuck connected on two," while Chuck will hear, "Adam connected on one, Burt connected on two."

Figure 14:
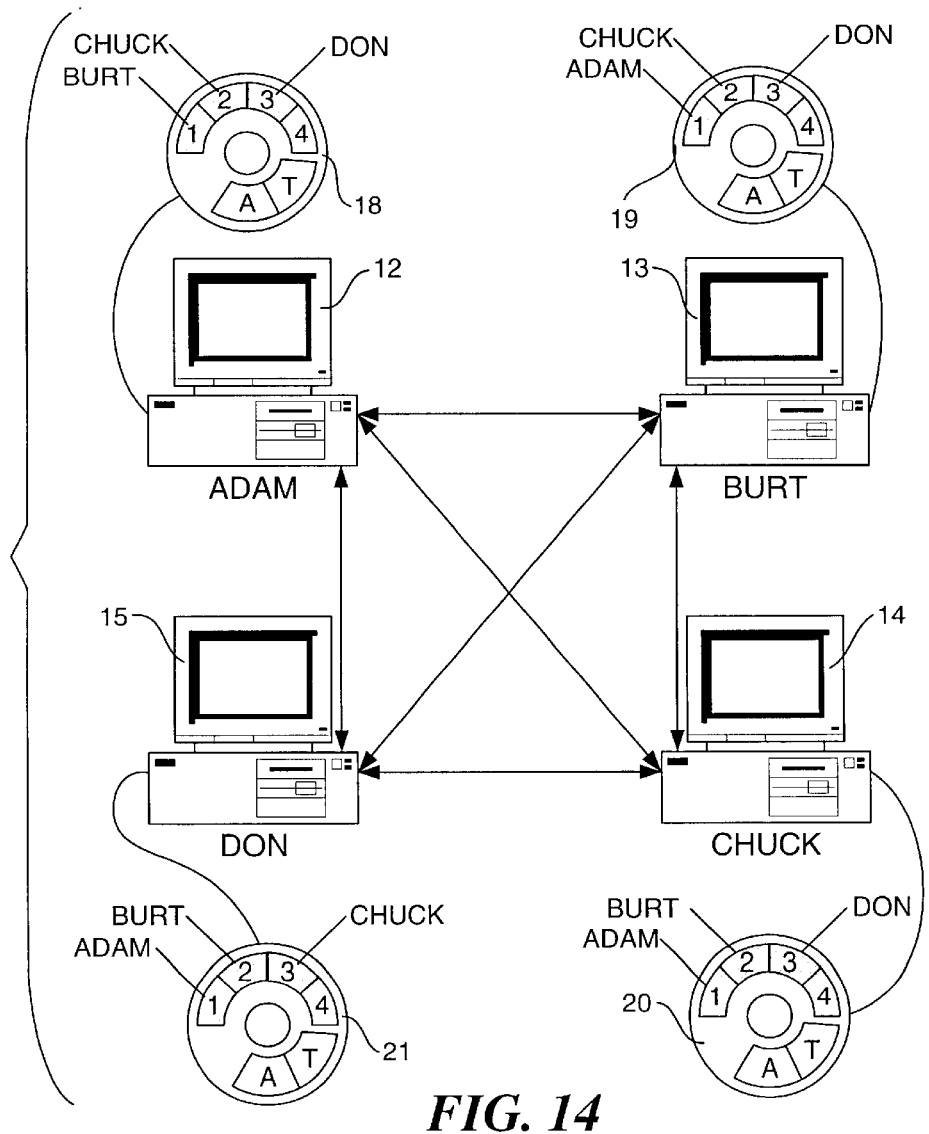
FIG. 14 is a schematic diagram illustrating the automatic assignment of chat channels when a fourth player joins the voice chat session.

As discussed above, Don had an MSN messenger status of "busy" when Adam sent out the original invitations to Burt, Chuck, and Don. Suppose that Don selected this status because he needed to perform an online check of his stock portfolio, but didn't want to be bothered while he was doing so and didn't want to log off of MSN messenger. Upon completing this task, assume further that Don decides to change his availability status back to "online" by activating status pull-down control 38 and selecting the "online" option from pull-down list 68. In response to this selection, since Don is now available to join Adam's chat session and will automatically be forwarded the invitation (both modal dialog and verbal message) via MSN messenger and gaming utility 30. Upon electing to join Adam's chat session, the channel assignments for each of Adam, Burt, Chuck, and Don will correspond to the diagram shown in FIG. 14. As was the prior case, since Don is the newcomer, Don will be assigned to the third channel of each of Adam's, Burt's, and Chuck's respective channel controller devices 18, 19, 20, and third channel indicator 97 on each of these devices will be lighted. With respect to Don's channel controller device 21, Adam, Burt, and Chuck will be assigned to channels 1, 2, and 3, respectively. Additionally, each of the chat participants will be verbally apprised of their respective chat channel assignments, e.g., Adam, Burt, and Chuck will hear, "Don connected on three," while Don will hear, "Adam connected on one, Burt connected on two, Chuck connected on three."

Figure 15:
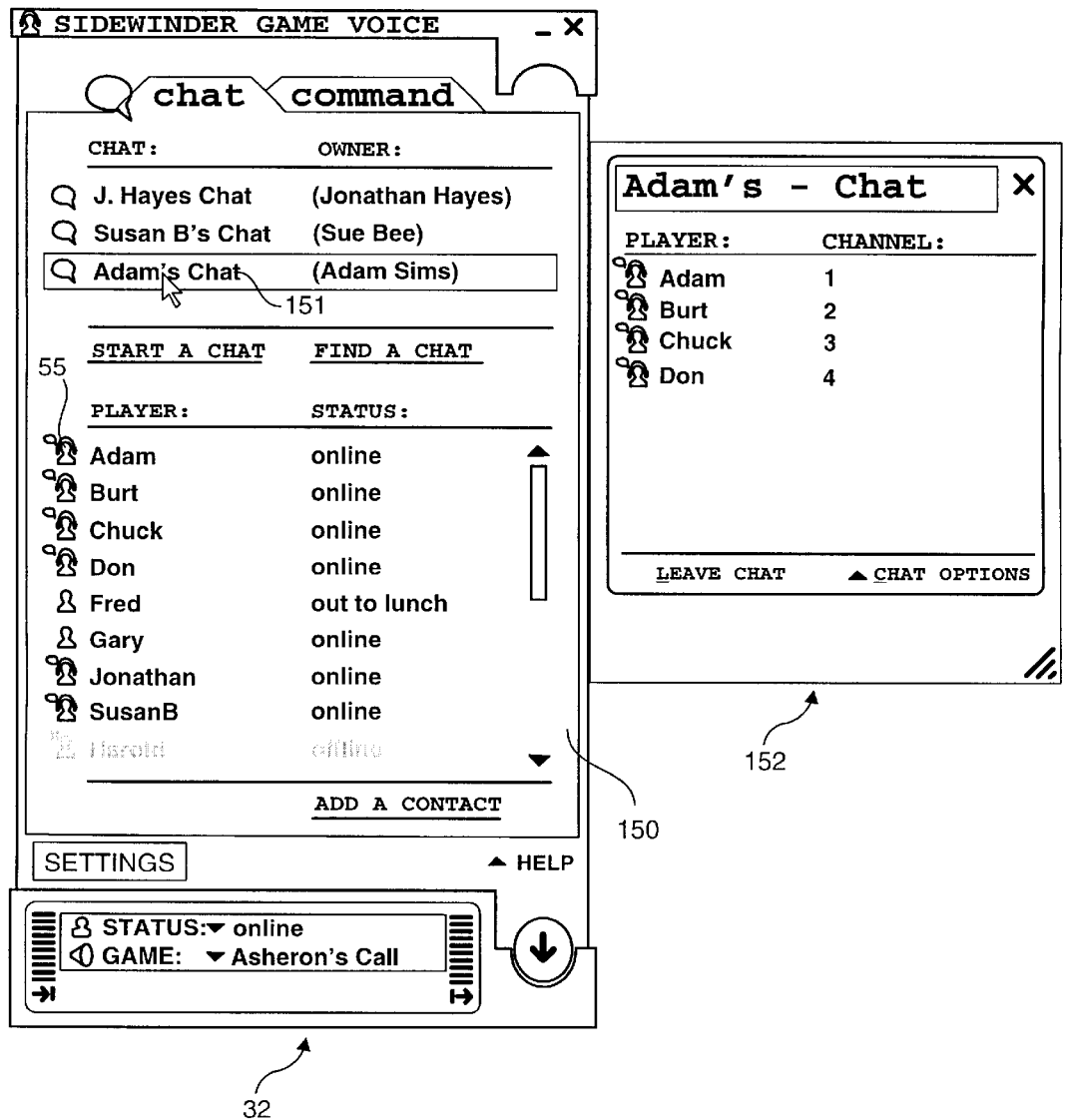
FIG. 15 is a representation of the user interface frame and an exemplary chat room pane illustrating how a player joins an open voice chat session.

As discussed above, in addition to enabling contacts to join a chat session via invitation, contacts may join any open chat session that appears in their chat panes. Suppose that Evan and Fred are friends of Adam, Burt, Chuck, and Don, and frequently play multi-player games with them. Both Evan and Fred are online, and logged into MSN messenger; Evan is running an instance of gaming utility 30, while Fred is not; Evan has selected his availability status to be "be right back," while Fred has selected his availability status to be "out to lunch." Further, suppose that Evan has finished his present task, and would like to join a chat session. Upon expanding his gaming utility 30 UI Frame 32 (or returning to a UI Frame that has already been expanded), Evan will see a chat pane 150 that includes Adam's Chat entry 151, as shown in FIG. 15. Evan immediately recognizes that his friend Adam is hosting an open chat, decides that he would like to join, and does so by clicking on Adam's Chat entry 151.

Figure 16:
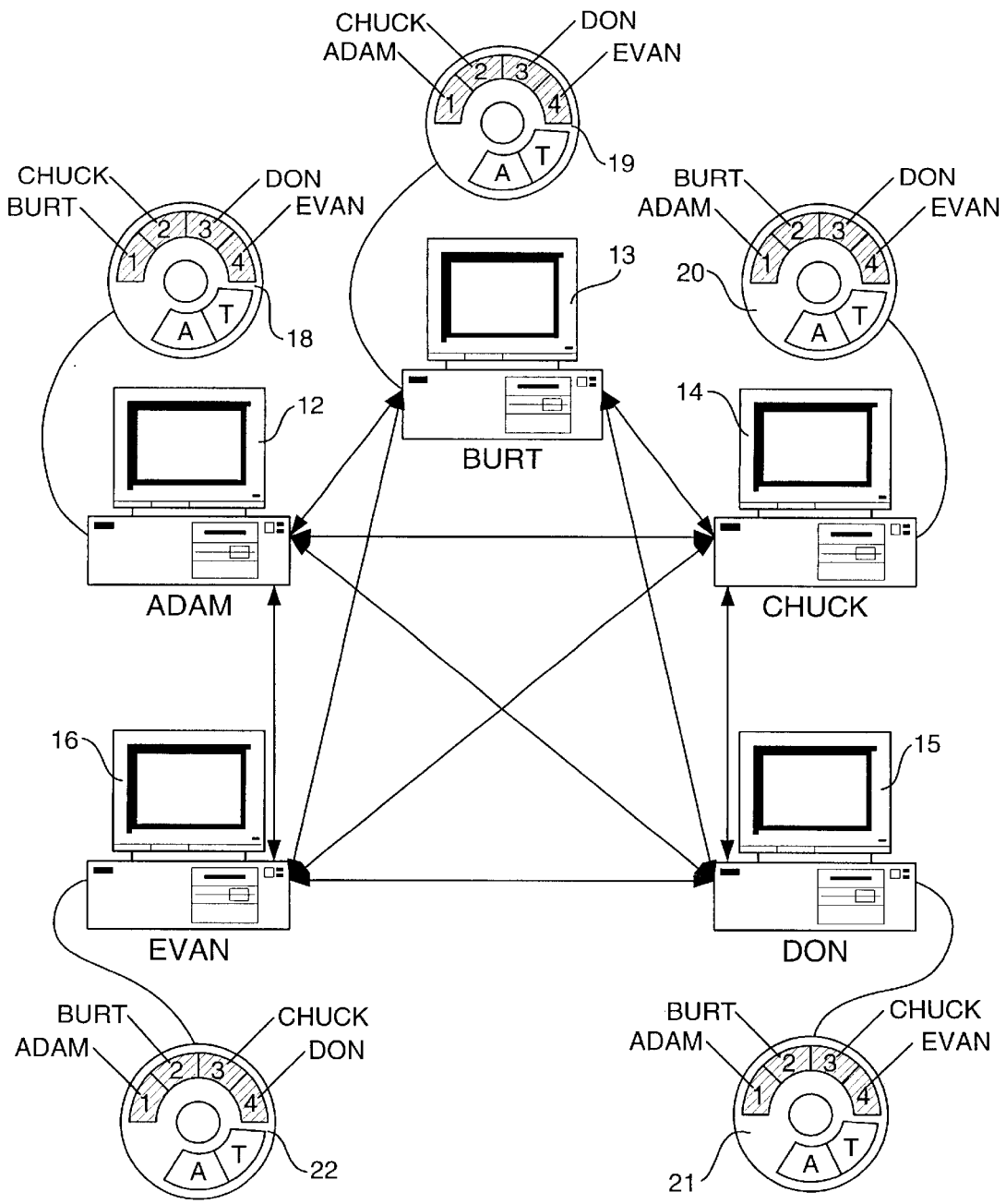
FIG. 16 is a schematic diagram illustrating the automatic assignment of chat channels when a fifth player joins the voice chat session.

Upon joining Adam's chat session, Evan will be assigned to channel 4, the next available channel on each of Adam's, Burt's, Chuck's, and Don's channel controller devices 18, 19, 20, 21, respectively, as shown in FIG. 16. Evan's chat room pane will appear like a chat room pane 152 shown in FIG. 15. In addition, Adam, Burt, Chuck, and Don have been respectively assigned to channels 1, 2, 3, and 4 of Evan's channel controller device 22, and each of Adam, Burt, Chuck, and Don receive a verbal announcement that states, "Evan connected on four, while Evan will hear a verbal announcement: "Adam connected on one, Burt connected on two, Chuck connected on three, Don connected on four."

Figure 17:
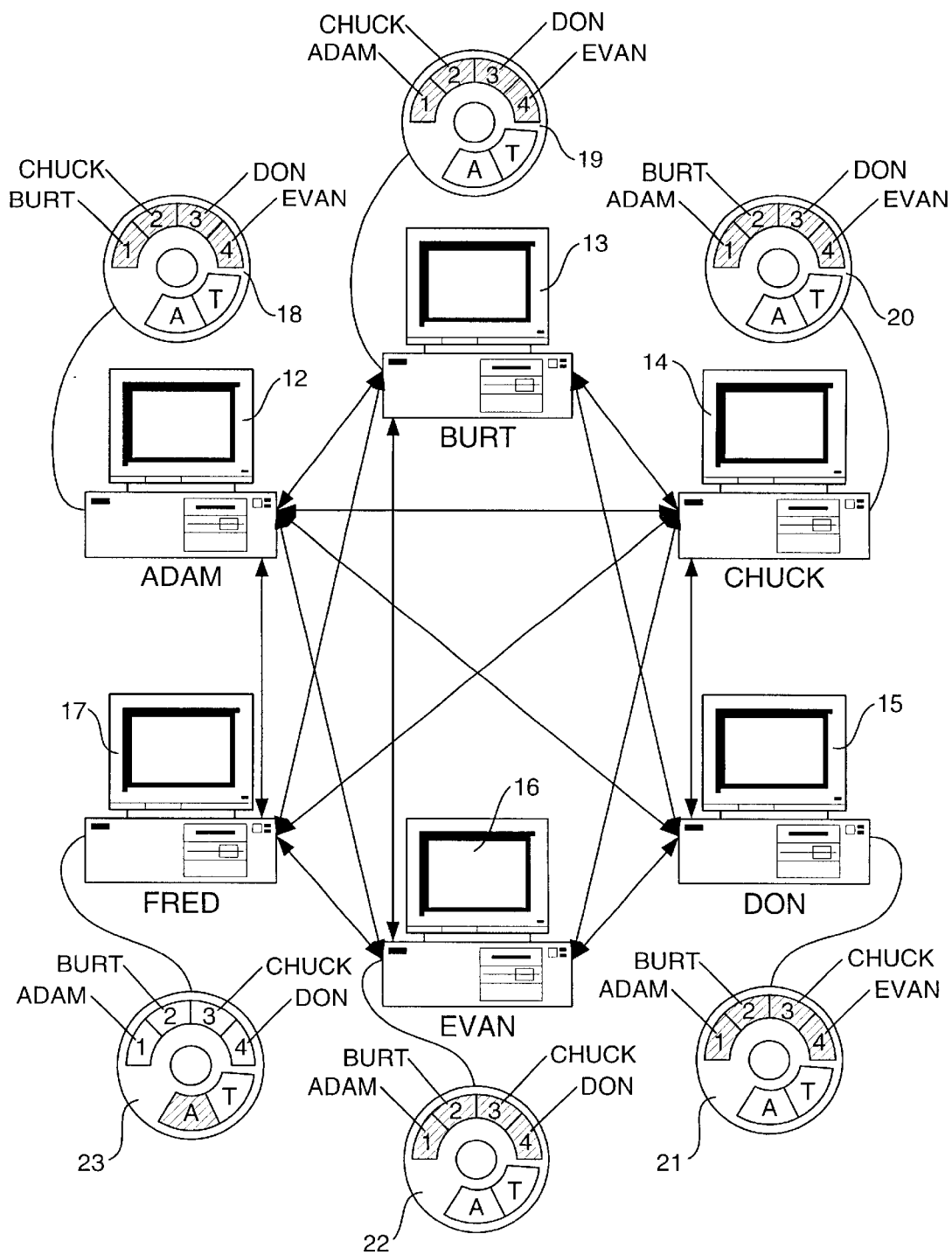
FIG. 17 is a schematic diagram illustrating the automatic assignment of chat channels when a sixth player joins the voice chat session.

Now suppose that Fred starts an instance of gaming utility 30 and sees that Adam is hosting an open chat (Fred's chat pane would appear like chat pane 150, except that Fred would not appear in the list of contacts, and Evan would). As was the case with Evan, above, Fred would join Adam's chat session by clicking on Adam's Chat entry 152. Upon doing so, Fred would join the chat session, but would not be assigned to a new channel, since there are no unassigned channels presently available. As a result, the channel assignments for each of Adam, Burt, Chuck, Don, and Evan remains the same as they were before Fred joined, as shown in FIG. 17. Accordingly, in this initial assignment of chat channels, the only way for Adam, Burt, Chuck, Don, and Evan to chat with Fred is to use "team" button 86 or "all" button 87. Additionally, "all" channel indicator 100 on Fred's channel controller device 23 is lighted to indicate that the all channel is Fred's presently active channel. In summary, if a contact joins a chat session after all of the individual channels have been assigned, that person will have his "all" button activated, and individual buttons will be assigned to prior chat session participants based on the order in which they joined the chat session until all of the available individual chat channels are assigned.

The verbal channel announcements are also changed when all of the individual channels have been assigned and a new chat participant joins the chat session. In the foregoing case, Adam, Burt, Chuck, Don and Evan will all hear, "Fred joined chat but not assigned to channel," while Fred will hear, "Adam assigned to one, Burt assigned to two, Chuck assigned to three, Don assigned to four, Evan was not assigned."

In addition to the automatic assignment of contacts to channels, individual players can reassign contacts to channels as they wish. For example, several contacts may be assigned to a single channel, or no channels at all. Furthermore, selected players may be assigned to the "team" channel. Note that none of the players can be assigned to the "all" channel, as when the "all" channel is the active channel on a player's channel controller device, all of the chat session participants receive voice chat data picked up by that player's microphone 28.

Figure 18:
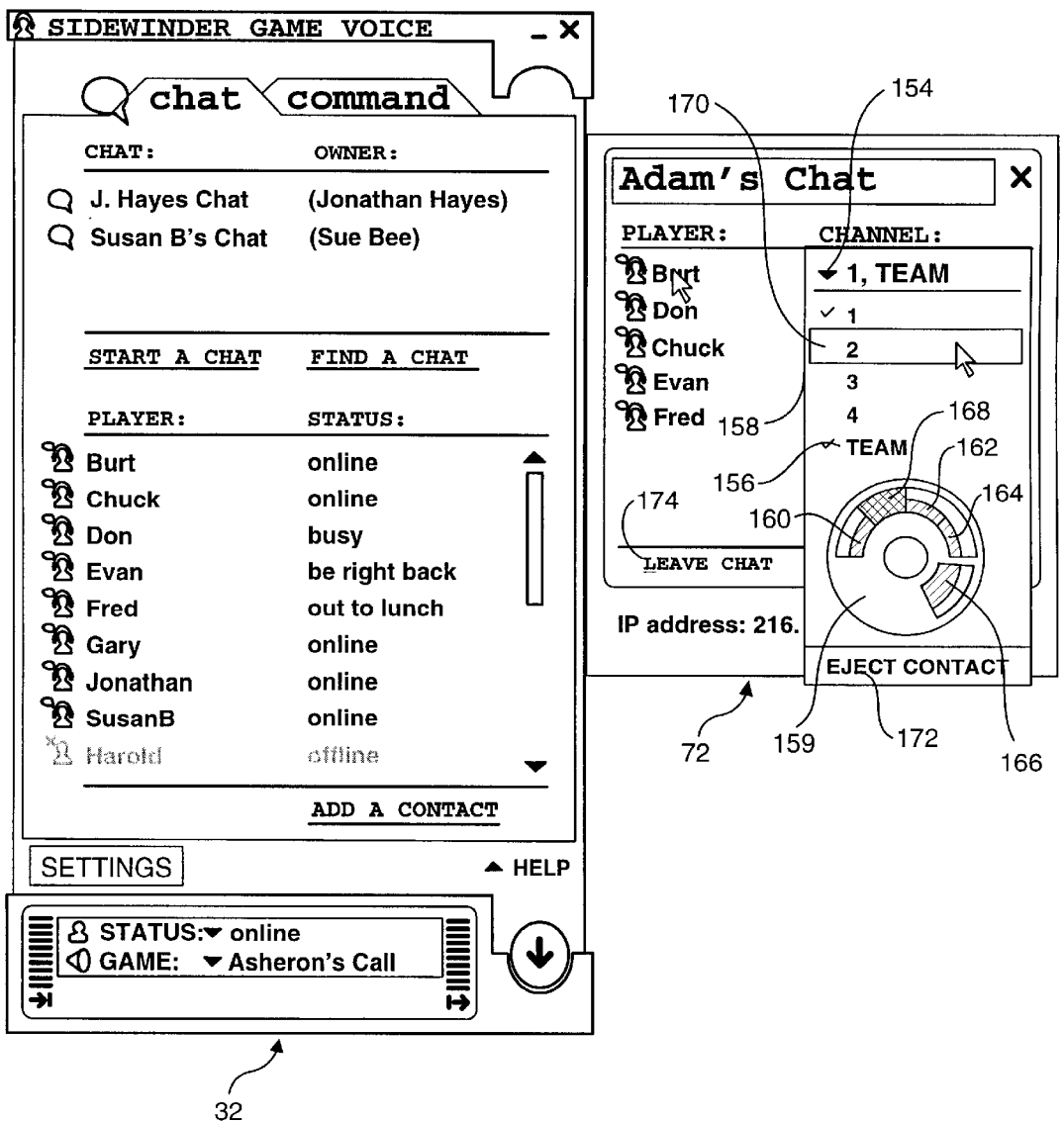
FIG. 18 is a representation of the user interface frame and an exemplary chat room pane that includes a channel assignment pull down control enabling a player to selectively reassign or pre-assign channel assignments.

As shown in FIG. 18, a user (e.g., Adam) may selectively reassign a contact to a new channel by activating a pull down control 154 adjacent to the contact that the user wishes to reassign. With respect to the Figure, consider that Adam has activated a channel assignment pull down control 154 adjacent to player Burt, so as to reassign Burt to another channel. As discussed above, Burt was automatically assigned to channel 1 when he joined the chat. Suppose that at some later point in time, Adam assigned Burt to his team by selecting a "team" option 156 in a pull down option list 158. Toward the bottom of the pull down option list, a graphic 159 is displayed corresponding to the present channel assignments for the player's channel controller device. In Adam's case, since channels 1, 2, 3, and 4 have all been previously assigned, each of their corresponding channel indicators will be shown in a highlighted manner, as shown in the Figure by the single hatched areas 160, 162, 164 and 166 (these areas are highlighted by using a different color than the rest of the graphic displayed to a user in an actual implementation). By doing so, the user will be informed which, if any, channels have yet to be assigned and are available for assignment. Additionally, the channel button in the graphic corresponding to the presently selected menu option will be completely highlighted, as shown by a cross-hatched area 168 corresponding to a channel 2 option 170.

Another option available to the host (but not to any of the other players) is the ability to "eject" players from the chat session. The host can eject a player by selecting the player from the list of chat session participants on chat room pane 72, activating the channel assignment pull-down control adjacent to the player, and selecting an "Eject Contact" option 172 in pull down option list 158. This selection will eject the player from the chat session. Since the chat session is open, the ejected player may attempt to rejoin the chat session. This can be prevented by the host by changing the chat session to an invite-only session, as described above. In addition, if the ejected player was assigned to a chat channel, the channel assignments for the player on the other player's computers are changed to an unassigned status, enabling these channels to be automatically assigned to the next player to join the chat session. Furthermore, each player will hear, "<Host Name> ejected <player> name" and "Channel <X> unassigned" (if channel X was assigned to the ejected player).

There will be instances in which a host or other player will desire to leave an ongoing chat session. A player indicates an intent to leave by activating a "Leave Chat" option 174 that is displayed adjacent to the bottom of chat room pane 72. If the player choosing to leave the chat session is not the host and was assigned to a chat channel, the channel assignments of that player on the other players' computers are changed to an unassigned status, enabling these channels to be automatically assigned to the next player to join the chat session. Upon leaving a chat session, the player will hear, "voice chat ended," while the remaining players will hear, <Player Name> left session" and "Channel <X> unassigned" if the player was assigned to channel. If the player leaving the chat is the host, one of the other players remaining in the chat session becomes the new host and acquires many of the extra capabilities that were only available to the previous host, and the channel assignments for the host on the other players' computers are changed to an unassigned status. In this case, upon the host leaving the chat session the other players will hear, "Host <Host Name> left room. Channel 1 unassigned. <Player Name> is the new host."

Each of channels 1–4 may be selectively reassigned to one or more contacts, or no contacts at all. For example, if Adam wants to switch the channel assignment of Burt from channel 1 to channel 2, he merely needs to click on channel 2 option 170. It is noted that a contact may also be assigned to multiple channels, if so desired. In this manner, each player can reassign chat contacts as desired. Additionally, as discussed above, a host may pre-assign channels by performing similar steps.

Each channel controller device allows a player to easily control the contacts with whom that player desires to chat. As discussed above, the active channels for a given user will be enunciated by lighting the indicators corresponding to those channels, as appropriate. A user can turn on and off (activate or deactivate) a given channel by simply toggling the button corresponding to that channel. Additionally, if a channel has not been assigned, pressing the channel's corresponding button will cause the channel's indicator to flash. In this manner, each chat participant can select the contacts the participant wishes to hear the participant's voice.

Chat contacts may also be assigned to the "team" button by using the player's channel controller device in the following manner, without requiring use of the gaming utility UI. The player first selects the channels desired to be active for the team, such as channels 1, 3, and 4. The player holds the "team" button down for three seconds, whereupon buttons 1, 3, and 4 will flash and then turn off, and the players who are assigned to channels 1, 3, and 4 will now be assigned to the "team" button. "Team" button indicator 99 is then turned on indicating that the "team" button is now the active channel. As discussed above, the "team" button assignment is separate and apart from individual button assignments, and the "team" button cannot be used in combination with one of individual buttons 1 through 4. Whenever a new team has been assigned, each of the players will hear, "New team assigned."

As an option to using a channel controller device, channel selections and assignments could be enabled through use of a computer keyboard or similar input device (e.g., electronic keypads) by remapping selected keys on the computer keyboard or input device to corresponding voice chat channels and functions. For example, the function keys of a keyboard (e.g. F1, F2, F3, etc.) could be remapped to replicate the functions of the channel buttons on the controller device, wherein activation of channel 1 could be toggled by pressing the F1 function key, activation of channel 2 could be toggled by pressing the F2 function key, etc.

Figure 19:
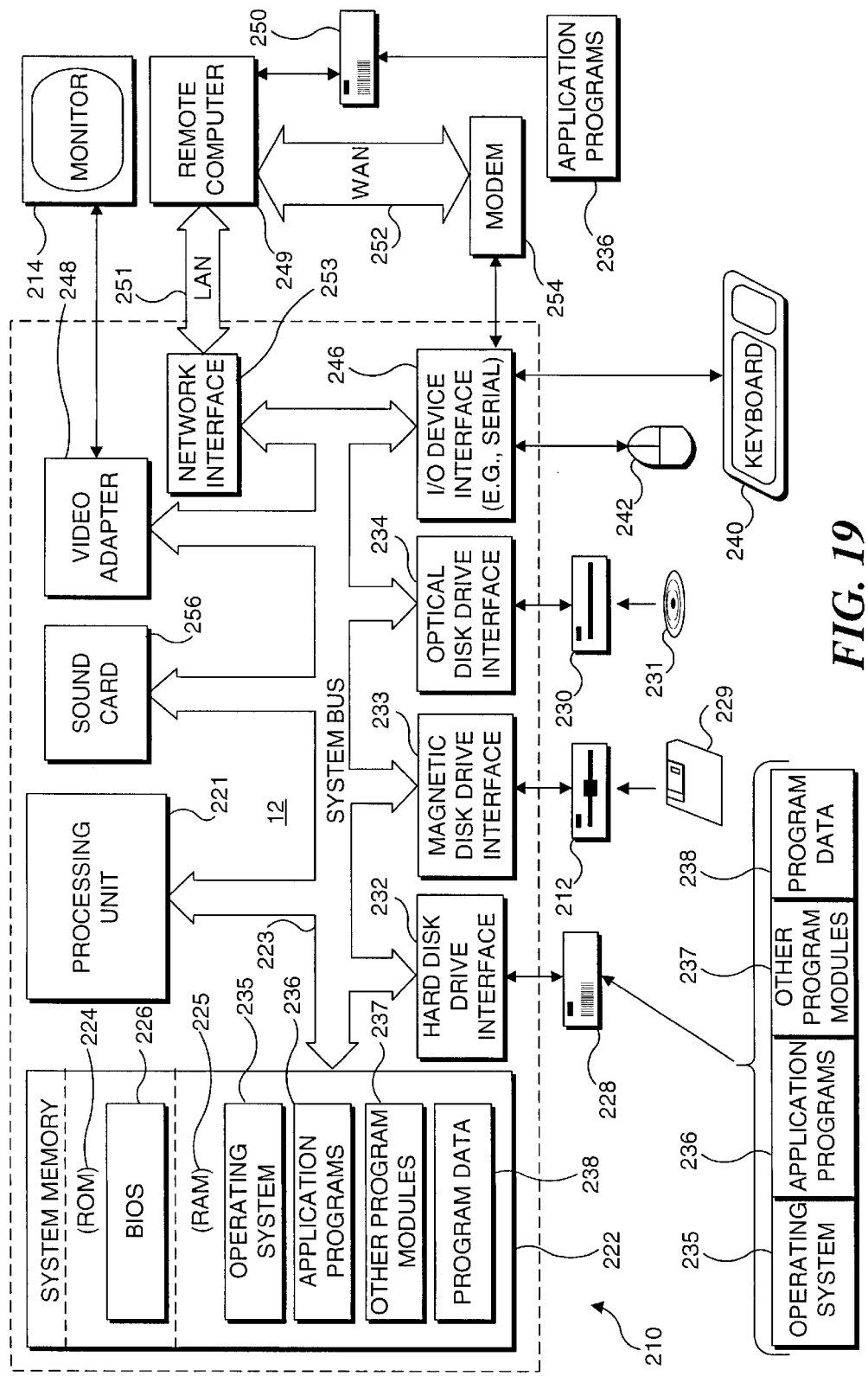
FIG. 19 is a schematic block diagram of a PC system with which the present invention can be used.

FIG. 19 and the following discussion are intended to provide a brief, general description of a suitable computing environment for use in connection with implementing the present invention. Although not required, certain aspects of the present invention are described in the general context of computer executable instructions, such as program modules, that are executed by a PC or workstation. Generally, program modules include routines, programs, objects, components, data structures, etc. that perform particular tasks. Moreover, those skilled in the art will appreciate that this invention may well be practiced with other computer system configurations, including hand-held devices, multi-processor systems, microprocessor based or programmable consumer electronic devices, network personal computers, minicomputers, mainframe computers, and the like.

With reference to FIG. 19, an exemplary system for implementing the present invention includes a general purpose computing device in the form of a conventional PC system 210, provided with a processing unit 221, a system memory 222, and a system bus 223. The system bus couples various system components including the system memory to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help to transfer information between elements within PC system 210, such as during start-up, is stored in ROM 224. PC system 210 further may include a hard disk drive 228 for reading from and writing to a hard disk, not shown, and may include magnetic disk drive 232 for reading from or writing to a removable magnetic disk 229, and an optical disk drive 230 for reading from or writing to a removable optical disk 231, such as a compact disk-ROM (CD-ROM), DVD, or other optical media. Hard disk drive 228, magnetic disk drive 212, and optical disk drive 230 are connected to system bus 223 by a hard disk drive interface 232, a magnetic disk drive interface 233, and an optical disk drive interface 234, respectively. The drives and their associated computer-readable media provide nonvolatile storage of computer readable machine instructions, data structures, program modules and other data for PC system 210. Although the exemplary environment described herein employs a hard disk, removable magnetic disk 229, and removable optical disk 231, it will be appreciated by those skilled in the art that other types of computer readable media, which can store data that are accessible by a computer, such as magnetic cassettes, flash memory cards, digital video disks, Bernoulli cartridges, RAM cards, ROM, and the like, may also be used in the exemplary operating environment.

A number of program modules may be stored on the hard disk, magnetic disk 229, optical disk 231, ROM 224 or RAM 225, including an operating system 235, one or more application programs 236 (such as a multiplayer game), other program modules 237, and program data 238. A user may enter commands and information into PC system 210 through input devices such as a keyboard 240, microphone 28 discussed above (but not shown in this Figure), and a pointing device 242. Other input devices (not shown) include a joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or (USB) port, as appropriate for the external devices that are thus coupled to the PC system. A monitor 214 or other type of display device is also connected to system bus 223 via an appropriate interface, such as a video adapter 248. In addition to the monitor, PCs are often coupled to other peripheral output devices (not shown), such as printers. Additionally, a soundcard 256 is used to supply a drive signal to a pair of speakers (not shown) to produce game sounds.

PC system 210 may operate in a networked environment using logical connections to one or more remote computers, such as a remote computer 249. Remote computer 249 may be another PC, a server, a router, a network PC, a peer device, or other common network node, and typically includes many or all of the elements described above in connection with PC system 210, although only an external memory storage device 250 has been illustrated in FIG. 19. The logical connections depicted in FIG. 19 include a local area network (LAN) 251 and a wide area network (WAN) 252. Such networking environments are common in offices, enterprise-wide computer networks, intranets and the Internet.

When used in a LAN networking environment, PC system 210 is connected to LAN 251 through a network interface or adapter 253. If used in a WAN networking environment, PC system 210 typically includes a modem 254, or other means for establishing communications over WAN 252, such as the Internet. Modem 254, which may be internal or external, is connected to the system bus 223, or coupled to the bus via I/O device interface 246, i.e., through a serial port. In a networked environment, program modules depicted relative to PC system 210, or portions thereof, may be stored in the remote memory storage device. It will be appreciated that the network connections shown are exemplary and other means of establishing a communications link between the computers may be used.

In the foregoing description of a preferred form of practicing the invention, MSN messenger was disclosed to provide behind the scenes online messaging service for supporting gaming utility 30. This exemplary disclosure is not meant to be limiting, as it will be understood by those skilled in the art that other online messaging services can alternatively be used, including America Online Corporation's instant messaging service, and ICQ™ messaging service. Furthermore, in the exemplary configuration discussed above, a plurality of PCs are connected to each other across a computer network. It is envisioned that other electronic devices may be used as well, such as thin consumer terminals, mobile phones, Pocket PCs, TV attached boxes (set top, gaming, video management), home servers, small business server appliances, and various focused enterprise devices.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling voice chat communication over a plurality of voice chat channels in a network of electronic devices linked in communication, each of said plurality of electronic devices being operated by a different user having a unique user identification, comprising the steps of:
   (a) enabling one of the users to initiate a voice chat session, said one of the users being a host of the voice chat session;
   (b) enabling users other than the host to join the voice chat session; and
   (c) automatically assigning different voice chat channels for the host and each of the other users who join the voice chat session.

2. The method of claim 1, wherein the plurality of voice chat channels are automatically assigned for each user based on an order in which the user joins the voice chat session.

3. The method of claim 2, wherein each user who joins the voice chat session is assigned to a next available voice chat channel for each of the users presently participating in the voice chat session, based on a sequential order of voice chat channels available to each user.

4. The method of claim 1, further comprising the step of enabling each user to manually reassign the voice chat channel for another user.

5. The method of claim 4, further comprising the step of providing a utility application that includes a user interface usable for manually reassigning the voice chat channel.

6. The method of claim 1, further comprising the steps of:
   (a) enabling the host to invite another user to join the voice chat session; and
   (b) enabling the host to selectively pre-assign a voice chat channel to the other user who has been invited by the host to join the voice chat session.

7. The method of claim 1, further comprising the step of providing an Internet Protocol (IP) address of the electronic device the host user is using so as to enable the host user to invite other players to the chat session through use of the IP address.

8. The method of claim 1, further comprising the steps of:
   (a) determining a network identification for each of said plurality of electronic devices; and
   (b) mapping each user identification to the network identification of the electronic device operated by each user, so as to provide a unique network identification of each of the users.

9. The method of claim 8, wherein each user is a member of an online messaging service that performs the steps of determining a network identification for each user's electronic device and mapping the user identification to the network identification of the user's electronic device when the user is logged onto the online messaging service.

10. The method of claim 9, wherein the online messaging service enables each user to create an individual contact list comprising a list of other users who the user might want to participate in a voice chat session, further comprising the step of providing a selectable list of contacts for each user based on the contact list that said user has created with the online messaging service.

11. The method of claim 10, further comprising the step of providing an availability status for each user in the contact list.

12. The method of claim 10, further comprising the step of enabling the host to select one or more contacts from among the selectable list of contacts, to invite to join the voice chat session.

13. The method of claim 12, further comprising the step of sending an electronic invitation to each of the contacts selected by the host to join the voice chat session.

14. The method of claim 13, wherein the electronic invitation includes an audible message apprising each recipient that the host has invited the user receiving the electronic invitation to join the voice chat session.

15. The method of claim 12, further comprising the steps of:
   (a) providing a user interface including a first display area on which the selectable list of contacts is displayed and a second display area corresponding to a voice chat session; and
   (b) enabling the host to select the one or more contracts to invite to join the voice chat session by selecting one or more contacts from among the selectable list of contacts displayed in the first display area and dragging and dropping them onto the second display area.

16. The method of claim 15, wherein a plurality of contacts can be selected and dragged and dropped onto the second display area at one time.

17. The method of claim 1, further comprising the step of providing visual indicia corresponding to the voice chat channel assignments for each user.

18. The method of claim 1, further comprising the step of providing audible indicia corresponding to the voice chat channel assignments for each user.

19. The method of claim 1, further comprising the step of enabling one or more users to be assigned to a team voice chat channel.

20. The method of claim 1, wherein the plurality of voice chat channels for each electronic device includes a fixed number of individual channels and a team channel, further comprising the step of automatically assigning the team channel to users who join the chat session after all of the individual channels have been assigned to other users who have previously joined the chat session.

21. The method of claim 1, further comprising the step of enabling a user to selectively transmit voice chat data to all of the other users who have joined the voice chat session.

22. The method of claim 1, further comprising the step of providing a respective channel controller device connected to each of said plurality of electronic devices so as to enable each user to selectively control which other users participating in the voice chat session are able to hear the user.

23. The method of claim 22, wherein the channel controller device comprises a plurality of visual indicators for indicating voice chat channel assignments, further comprising the step of automatically enunciating the visual indicators in response to the assignment of the voice chat channels.

24. The method of claim 22, wherein each channel controller device includes a plurality of switches, each switch corresponding to a different individual voice chat channel and a team channel, further comprising the step of enabling individual voice chat channels to be assigned to the team channel through activation of selected switches among said plurality of switches.

25. The method of claim 22, further comprising the step of providing a headset comprising an earphone and a microphone that are connected to each channel controller device.

26. The method of claim 1, further comprising the steps of:
   (a) enabling a user to leave a voice chat session; and (b) changing any voice chat channels that were assigned to the user to an unassigned status so as to enable reassignment of those voice chat channels to a next player to join the voice chat session.

27. The method of claim 26, further comprising the step of reassigning a host status to a user who was the first among the users who still remain in the voice chat session to join the voice chat session, if the user leaving the voice chat session was the host.

28. The method of claim 1, further comprising the steps of:
   (a) enabling the host to eject a user from the voice chat session; and
   (b) changing any voice chat channels that were assigned to the user to an unassigned status so as to enable reassignment of those voice chat channels to a next player to join the voice chat session.

29. A computer readable medium having computer executable instructions for performing the steps recited in claim 1.

30. A computer readable medium having computer executable instructions for performing the steps recited in claim 4.

31. A system for enabling voice chat communication between a plurality of users over a communications network, each user having a unique user identification, comprising:
   a plurality of electronic devices coupled to the communications network, each user operating a different one of the plurality of electronic devices, each of the plurality of electronic devices being identified by a network identifier and including:
   (a) a display;
   (b) a memory in which a plurality of machine instructions are stored; and
   (c) a processor coupled to the memory for executing said plurality of machine instructions, said processor implementing a plurality of functions when executing the machine instructions, including:
      (i) producing a user interface for the voice chat session on the display;
      (ii) enabling one of the users to initiate a voice chat session, said user being a host of the voice chat session;
      (iii) enabling users other than the host to join the voice chat session; and
      (iv) for each of said plurality of electronic devices, automatically assigning voice chat channels to users other than the user operating the electronic device so as to enable each user to selectively communicate with the other users in the voice chat session.

32. The system of claim 31, wherein the plurality of voice chat channels are automatically assigned for each user based on an order in which the user joins the voice chat session.

33. The system of claim 31, wherein execution of the plurality of machine instructions further implements the function of enabling a user to reassign other users to voice chat channels through interaction with the user interface.

34. The system of claim 31, further including:
   (a) a microphone operatively coupled to each electronic device, said microphone producing an audio signal in response to words spoken by a user of the electronic device into the microphone, said audio signal being converted to audio data that are transmitted over the communications network to an electronic device operated by a selected other user; and
   (b) a least one sound transducer operative coupled to the electronic device operated by the selected other user so as to replicate the words that were spoken, in response to a drive signal produced by the electronic device operated by the selected user after receiving the audio data.

35. The system of claim 34, wherein execution of said plurality of machine instructions further performs the function of providing drive signals to selected sound transducers based on the voice chat channel assignments such that the words spoken by a user of the microphone are heard by selected users among participants in the voice chat session.

36. The system of claim 34, further including a channel controller device connected to each of said plurality of electronic devices, said channel controller device including a plurality of voice chat channel selection switches so as to enable the user speaking the words to determine the selected other user who will hear the words that are replicated.

\* \* \* \* \*